United States Patent
Lakkis et al.

(10) Patent No.: US 9,787,371 B2
(45) Date of Patent: Oct. 10, 2017

(54) METHOD AND APPARATUS FOR DIRECTIONAL CHANNEL ACCESS IN A WIRELESS COMMUNICATIONS SYSTEM

(75) Inventors: Ismail Lakkis, San Diego, CA (US); Vered Bar Bracha, Hod Hasharon (IL)

(73) Assignee: QUALCOMM, Incorporated, San Diego, CA (US)

( * ) Notice: Subject to any disclaimer, the term of this patent is extended or adjusted under 35 U.S.C. 154(b) by 409 days.

(21) Appl. No.: 12/483,987

(22) Filed: Jun. 12, 2009

(65) Prior Publication Data

US 2010/0118749 A1 May 13, 2010

Related U.S. Application Data

(60) Provisional application No. 61/113,602, filed on Nov. 12, 2008, provisional application No. 61/164,422, filed on Mar. 28, 2009.

(51) Int. Cl.
| | |
|---|---|
| *H04W 16/28* | (2009.01) |
| *H04B 7/0408* | (2017.01) |
| *H04B 7/06* | (2006.01) |
| *H04B 7/08* | (2006.01) |
| *H04W 24/00* | (2009.01) |
| *H04W 48/16* | (2009.01) |

(52) U.S. Cl.
CPC ......... *H04B 7/0408* (2013.01); *H04B 7/0619* (2013.01); *H04B 7/0695* (2013.01); *H04B 7/088* (2013.01); *H04W 16/28* (2013.01); *H04W 24/00* (2013.01); *H04W 48/16* (2013.01)

(58) Field of Classification Search
CPC ............... H04W 16/28; H04W 72/046; H04B 1/005–1/0096; H04B 1/1009; H04B 1/126; H04B 7/024–7/0404; H04B 7/0452; H04B 7/08–7/0897
USPC .................................................. 370/310–350
See application file for complete search history.

(56) References Cited

U.S. PATENT DOCUMENTS

| | | |
|---|---|---|
| 5,095,535 A | 3/1992 | Freeburg |
| 6,011,784 A | 1/2000 | Brown et al. |
| 7,103,306 B2 | 9/2006 | Shimizubata |

(Continued)

FOREIGN PATENT DOCUMENTS

| | | |
|---|---|---|
| CN | 1930797 A | 3/2007 |
| CN | 101137185 A | 3/2008 |

(Continued)

OTHER PUBLICATIONS

International Search Report—PCT/US2009/064237—International Search Authority—European Patent Office, dated May 3, 2010.

(Continued)

*Primary Examiner* — Andrew Chriss
*Assistant Examiner* — Kenan Cehic
(74) *Attorney, Agent, or Firm* — Patterson & Sheridan, LLP

(57) ABSTRACT

A method of wireless communications is provided. The method includes detecting at least a portion of a preamble of a packet transmitted by a first device by sweeping over a plurality of receive directions; receiving and decoding a header of the packet based on a first receive direction to identify that the first device had transmitted the packet; and completing reception of the packet based on a second receive direction. An apparatus for performing the method is also disclosed.

35 Claims, 22 Drawing Sheets

(56) References Cited

U.S. PATENT DOCUMENTS

| | | |
|---|---|---|
| 7,103,386 B2 | 9/2006 | Hoffmann et al. |
| 7,340,279 B2 | 3/2008 | Chen et al. |
| 7,359,398 B2 | 4/2008 | Sugaya |
| 7,460,834 B2 | 12/2008 | Johnson et al. |
| 7,586,880 B2 | 9/2009 | Proctor, Jr. |
| 8,553,659 B2 | 10/2013 | Nandagopalan et al. |
| 2002/0137538 A1 | 9/2002 | Chen et al. |
| 2003/0112810 A1* | 6/2003 | Nakabayashi et al. ....... 370/401 |
| 2003/0146880 A1 | 8/2003 | Chiang et al. |
| 2004/0218683 A1 | 11/2004 | Batra et al. |
| 2005/0068934 A1 | 3/2005 | Sakoda |
| 2005/0096544 A1 | 5/2005 | Hao et al. |
| 2005/0107066 A1 | 5/2005 | Erskine et al. |
| 2006/0030364 A1 | 2/2006 | Olesen et al. |
| 2006/0107166 A1 | 5/2006 | Nanda |
| 2006/0161223 A1 | 7/2006 | Vallapureddy et al. |
| 2006/0187840 A1 | 8/2006 | Cuffaro et al. |
| 2007/0113159 A1 | 5/2007 | Lakkis |
| 2007/0185550 A1 | 8/2007 | Vallapureddy et al. |
| 2007/0195811 A1* | 8/2007 | Basson et al. ................ 370/441 |
| 2008/0039107 A1 | 2/2008 | Ma et al. |
| 2008/0085681 A1 | 4/2008 | Wang et al. |
| 2008/0117865 A1 | 5/2008 | Li et al. |
| 2008/0152030 A1 | 6/2008 | Abramov et al. |
| 2008/0153502 A1* | 6/2008 | Park et al. .................... 455/446 |
| 2008/0175198 A1 | 7/2008 | Singh et al. |
| 2008/0187067 A1 | 8/2008 | Wang et al. |
| 2009/0046653 A1 | 2/2009 | Singh et al. |
| 2009/0154489 A1 | 6/2009 | Bae et al. |
| 2009/0233549 A1 | 9/2009 | Maltsev et al. |
| 2009/0238156 A1 | 9/2009 | Yong et al. |
| 2010/0014463 A1 | 1/2010 | Nagai et al. |
| 2010/0118716 A1 | 5/2010 | Lakkis et al. |
| 2010/0118802 A1 | 5/2010 | Lakkis et al. |
| 2010/0118835 A1 | 5/2010 | Lakkis et al. |
| 2010/0135224 A1 | 6/2010 | Chen et al. |
| 2010/0142460 A1 | 6/2010 | Zhai et al. |

FOREIGN PATENT DOCUMENTS

| | | |
|---|---|---|
| EP | 1912346 A1 | 4/2008 |
| EP | 2043281 A1 | 4/2009 |
| JP | 2002057677 A | 2/2002 |
| JP | 2002539667 A | 11/2002 |
| JP | 2004072539 A | 3/2004 |
| JP | 2004343759 A | 12/2004 |
| JP | 2005503061 A | 1/2005 |
| JP | 2007074600 A | 3/2007 |
| JP | 2008512954 A | 4/2008 |
| JP | 2008113450 A | 5/2008 |
| JP | 2008187289 A | 8/2008 |
| JP | 2008219554 A | 9/2008 |
| KR | 1020040029174 A | 4/2004 |
| KR | 2004052494 A | 6/2004 |
| KR | 20060119986 A | 11/2006 |
| TW | 200818783 A | 4/2008 |
| WO | 2004071022 A1 | 8/2004 |
| WO | 2006031495 A2 | 3/2006 |
| WO | WO2007040554 A2 | 4/2007 |
| WO | 2008002091 A1 | 1/2008 |
| WO | 2008069245 A1 | 6/2008 |
| WO | WO2008084800 A1 | 7/2008 |
| WO | 2009114621 A2 | 9/2009 |

OTHER PUBLICATIONS

Invitation to Pay Additional Fees—PCT/US2009/064237, International Search Authority—European Patent Office—dated Mar. 10, 2010.

Ssang-Bong Jung et al: "Channel Time Allocation and Routing Algorithm for Multi-hop Communications in IEEE 802.15.3 High-Rate WPAN Mesh Networks" May 27, 2007 (May 27, 2007), Computational Science A ICCS 2007; [Lecture Notes in Computer Science;;LNCS], Springer Berlin Heidelberg, Berlin, Heidelberg, pp. 457-465 , XP019094518 ISBN: 9783540725893 the whole document.

International Preliminary Report on Patentability—PCT/US2009/064242, The International Bureau of WIPO—Geneva, Switzerland, dated Mar. 14, 2011.

Written Opinion—PCT/US2009/064237—International Search Authority European Patent Office—dated May 3, 2010.

Lakkis, et al., "Beamforming," Project: IEEE P802.15 Working Group for Wireless Personal Area Networks (WPANs), Doc.: 15-08-0361-00-003c, May 14, 2008, 46 pages.

Lakkis, et al., "mmWave Beamforming," Project: IEEE P802.15 Working Group for Wireless Personal Area Networks (WPANs), doc.: IEEE 802.15-08-0055-01-003c, Jan. 15, 2008, 64 pages.

Lakkis, et al., "mmWave Multi-Resolution Beamforming," Project: IEEE P802.15 Working Group for Wireless Personal Area Networks (WPANs), doc.: IEEE 802.15-08-0182-00-003c, Mar. 19, 2008, 39 pages.

Lakkis, et al., "TG3c Call for Proposals," IEEE P802.15 Working Group for Wireless Personal Area Networks (WPANs), Beamforming Draft, 15-08-0355-00-003c, May 14, 2008, 43 pages.

Taiwan Search Report—TW098138524—TIPO—Dec. 28, 2012.

IEEE Std 802.11™ 2007 "Standard for Information technology—Telecommunications and information exchange between systems—Local and metropolitan area networks—Specific requirements Part 11: Wireless LAN Medium Access Control (MAC) and Physical Layer (PHY) Specifications," Jun. 2007.

* cited by examiner

2140

| Current Q-omni Beacon Identifier (4 bits) | Number of Q-omni Beacons (4 bits) | Length (= 5) | Element ID |
|---|---|---|---|
| 1 | 1 | 1 | 1 |
| 2150 | 2152 | 2154 | 2156 |

| Octets: 8 | 1 | 1 | 1 | 3 | 3 | 3 | 3 | 6 |
|---|---|---|---|---|---|---|---|---|
| PNC Address | PNC Response | Piconet Mode | MAX TX Power Level | Duration per S-CAP | Number of S-CAP Periods | CAP End time | Superframe Duration | Time Token |
| 2162 | 2164 | 2166 | 2168 | 2170 | 2172 | 2174 | 2176 | 2178 |

FIG. 21B

METHOD AND APPARATUS FOR DIRECTIONAL CHANNEL ACCESS IN A WIRELESS COMMUNICATIONS SYSTEM

CLAIM OF PRIORITY

This application claims the benefit of and priority to U.S. Provisional Patent Application No. 61/113,602, entitled "METHOD AND APPARATUS FOR CHANNEL ACCESS IN A WIRELESS COMMUNICATIONS SYSTEM", filed Nov. 12, 2008, the disclosure of which is hereby incorporated by reference herein.

This application claims the benefit of and priority to U.S. Provisional Patent Application No. 61/164,422, entitled "METHOD AND APPARATUS FOR CHANNEL ACCESS IN A WIRELESS COMMUNICATIONS SYSTEM", filed Mar. 28, 2009, the disclosure of which is hereby incorporated by reference herein.

BACKGROUND

I. Field of the Disclosure

This disclosure relates generally to wireless communications systems and, more particularly, to a method and apparatus for directional channel access in a wireless communications system in a wireless communications system.

II. Description of the Related Art

In one aspect of the related art, devices with a physical (PHY) layer supporting either single carrier or Orthogonal Frequency Division Multiplexing (OFDM) modulation modes may be used for millimeter wave communications, such as in a network adhering to the details as specified by the Institute of Electrical and Electronic Engineers (IEEE) in its 802.15.3c standard. In this example, the PHY layer may be configured for millimeter wave communications in the spectrum of 57 gigahertz (GHz) to 66 GHz and specifically, depending on the region, the PHY layer may be configured for communication in the range of 57 GHz to 64 GHz in the United States and 59 GHz to 66 GHz in Japan.

To allow interoperability between devices or networks that support either OFDM or single-carrier modes, both modes further support a common mode. Specifically, the common mode is a single-carrier base-rate mode employed by both OFDM and single-carrier transceivers to facilitate co-existence and interoperability between different devices and different networks. The common mode may be employed to provide beacons, transmit control and command information, and used as a base rate for data packets.

A single-carrier transceiver in an 802.15.3c network typically employs at least one code generator to provide spreading of the form first introduced by Marcel J. E. Golay (referred to as Golay codes), to some or all fields of a transmitted data frame and to perform matched-filtering of a received Golay-coded signal. Complementary Golay codes are sets of finite sequences of equal length such that a number of pairs of identical elements with any given separation in one sequence is equal to the number of pairs of unlike elements having the same separation in the other sequences. S. Z. Budisin, "Efficient Pulse Compressor for Golay Complementary Sequences," Electronic Letters, 27, no. 3, pp. 219-220, Jan. 31, 1991, which is hereby incorporated by reference, shows a transmitter for generating Golay complementary codes as well as a Golay matched filter.

For low-power devices, it is advantageous for the common mode to employ a Continuous Phase Modulated (CPM) signal having a constant envelope so that power amplifiers can be operated at maximum output power without affecting the spectrum of the filtered signal. Gaussian Minimum Shift Keying (GMSK) is a form of continuous phase modulation having compact spectral occupancy by choosing a suitable bandwidth time product (BT) parameter in a Gaussian filter. The constant envelope makes GMSK compatible with non-linear power amplifier operation without the concomitant spectral regrowth associated with non-constant envelope signals.

Various techniques may be implemented to produce GMSK pulse shapes. For example, $\pi/2$-binary phase shift key (BPSK) modulation (or $\pi/2$-differential BPSK) with a linearized GMSK pulse may be implemented, such as shown in I. Lakkis, J. Su, & S. Kato, "A Simple Coherent GMSK Demodulator", IEEE Personal, Indoor and Mobile Radio Communications (PIMRC) 2001, which is incorporated by reference herein, for the common mode.

SUMMARY

Aspects disclosed herein may be advantageous to systems employing millimeter-wave wireless personal area networks (WPANs) such as defined by the IEEE802.15.3c protocol. However, the disclosure is not intended to be limited to such systems, as other applications may benefit from similar advantages.

According to another aspect of the disclosure, a method of wireless communications is provided. The method includes detecting at least a portion of a preamble of a packet transmitted by a first device by sweeping over a plurality of receive directions; receiving and decoding a header of the packet based on a first receive direction to identify that the first device had transmitted the packet; and completing reception of the packet based on a second receive direction.

According to another aspect of the disclosure, a communications apparatus is provided, the wireless communications apparatus includes means for detecting at least a portion of a preamble of a packet transmitted by a first device by sweeping over a plurality of receive directions; means for receiving and decoding a header of the packet based on a first receive direction to identify that the first device had transmitted the packet; and means for completing reception of the packet based on a second receive direction.

According to another aspect of the disclosure, a computer-program product for wireless communications is provided. The computer-program product includes a machine-readable medium with instructions executable to detect at least a portion of a preamble of a packet transmitted by a first device by sweeping over a plurality of receive directions; receive and decode a header of the packet based on a first receive direction to identify that the first device had transmitted the packet; and, complete reception of the packet based on a second receive direction.

According to another aspect of the disclosure, an apparatus for communications is provided. The communications apparatus includes a processing system configured to detect at least a portion of a preamble of a packet transmitted by a first device by sweeping over a plurality of receive directions; receive and decode a header of the packet based on a first receive direction to identify that the first device had transmitted the packet; and complete reception of the packet based on a second receive direction.

BRIEF DESCRIPTION OF THE DRAWINGS

FIGS. 21A and 21B are beamforming and superframe information elements configured in accordance with one aspect of the disclosure; and, FIG. 22 is a flow chart of a device with an omnidirectional receive antenna configured in accordance with various aspects of the disclosure.

Figure 1:
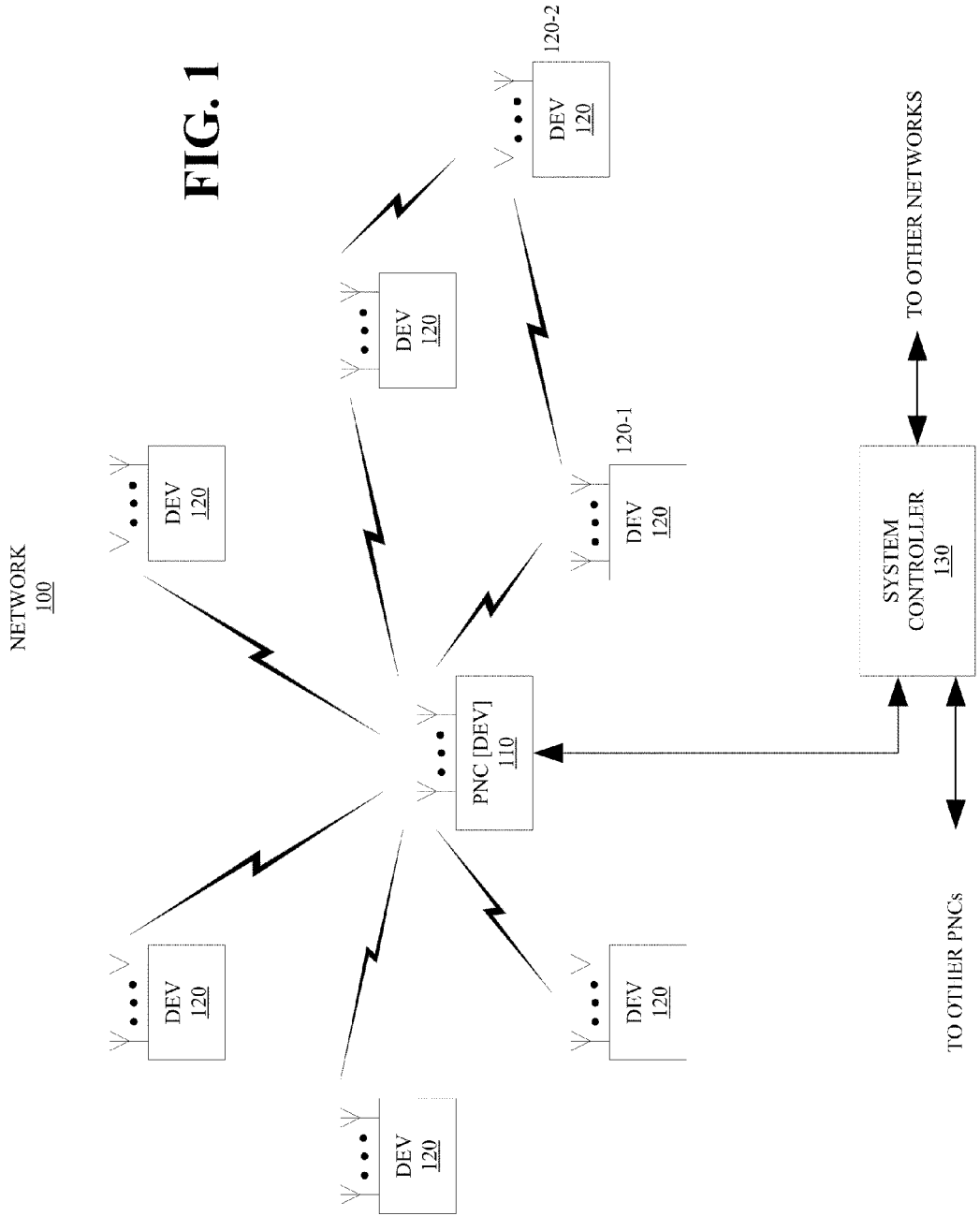
FIG. 1 is a diagram of a wireless network configured in accordance with an aspect of the disclosure.

In accordance with common practice the various features illustrated in the drawings may be simplified for clarity. Thus, the drawings may not depict all of the components of a given apparatus (e.g., device) or method. In addition, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the disclosure. It should be understood, however, that the particular aspects shown and described herein are not intended to limit the disclosure to any particular form, but rather, the disclosure is to cover all modifications, equivalents, and alternatives falling within the scope of the disclosure as defined by the claims.

In one aspect of the disclosure, a dual-mode millimeter wave system employing single-carrier modulation and OFDM is provided with a single-carrier common signaling. The common mode is a single-carrier mode used by both single-carrier and OFDM devices for beaconing, signaling, beamforming, and base-rate data communications.

Several aspects of a wireless network 100 will now be presented with reference to FIG. 1, which is a network formed in a manner that is compatible with the IEEE 802.15.3c Personal Area Networks (PAN) standard and herein referred to as a piconet. The network 100 is a wireless ad hoc data communication system that allows a number of independent data devices such as a plurality of data devices (DEVs) 120 to communicate with each other. Networks with functionality similar to the network 100 are also referred to as a basic service set (BSS), or independent basic service (IBSS) if the communication is between a pair of devices.

Each DEV of the plurality of DEVs 120 is a device that implements a MAC and PHY interface to the wireless medium of the network 100. A device with functionality similar to the devices in the plurality of DEVs 120 may be referred to as an access terminal, a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

Under IEEE 802.15.3c, one DEV will assume the role of a coordinator of the piconet. This coordinating DEV is referred to as a PicoNet Coordinator (PNC) and is illustrated in FIG. 1 as a PNC 110. Thus, the PNC includes the same device functionality of the plurality of other devices, but provides coordination for the network. For example, the PNC 110 provides services such as basic timing for the network 100 using a beacon; and management of any Quality of Service (QoS) requirements, power-save modes, and network access control. A device with similar functionality as described for the PNC 110 in other systems may be referred to as an access point, a base station, a base transceiver station, a station, a terminal, a node, an access terminal acting as an access point, or some other suitable terminology. Both DEVs and PNCs may be referred to as a wireless nodes. In other words, a wireless node may be a DEV or a PNC.

The PNC 110 coordinates the communication between the various devices in the network 100 using a structure referred as a superframe. Each superframe is bounded based on time by beacon periods. The PNC 110 may also be coupled to a system controller 130 to communicate with other networks or other PNCs.

Figure 2:
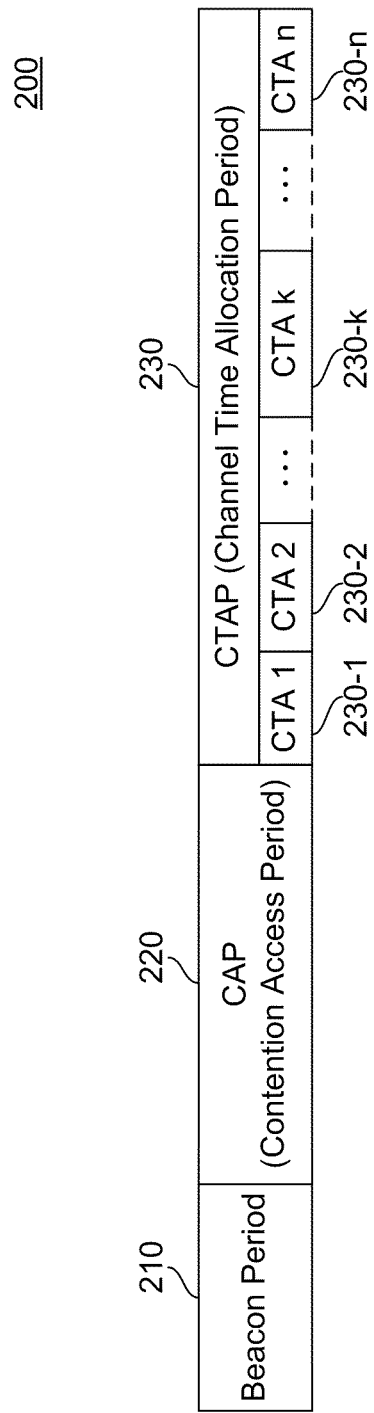
FIG. 2 is a diagram of a superframe structure configured in accordance with an aspect of the disclosure that is used in the wireless network of FIG. 1.

FIG. 2 illustrates a superframe 200 used for piconet timing in the network 100. In general, a superframe is a basic time division structure containing a beacon period, a channel time allocation period and, optionally, a contention access period. The length of a superframe is also known as the beacon interval (BI). In the superframe 200, a beacon period (BP) 210 is provided during which a PNC such as the PNC 110 sends beacon frames, as further described herein.

A Contention Access Period (CAP) 220 is used to communicate commands and data either between the PNC 110 and a DEV in the plurality of DEVs 120 in the network 100, or between any of the DEVs in the plurality of DEVs 120 in the network 100. The access method for the CAP 220 can be based on a slotted aloha or a carrier sense multiple access with collision avoidance (CSMA/CA) protocol. The CAP 220 may not be included by the PNC 110 in each superframe.

A Channel Time Allocation Period (CTAP) 220, which is based on a Time Division Multiple Access (TDMA) protocol, is provided by the PNC 110 to allocate time for the plurality of DEVs 120 to use the channels in the network 100. Specifically, the CTAP is divided into one or more time periods, referred to as Channel Time Allocations (CTAs), that are allocated by the PNC 110 to pairs of devices; one pair of devices per CTA. Thus, the access mechanism for CTAs is TDMA-based.

During the beacon period, beacons using a set of antenna patterns, referred to as quasi-omni, or "Q-Omni" beacons, are first transmitted. Directional beacons—that is, beacons transmitted using higher antenna gain in some direction(s) may additionally be transmitted during the beacon period or in the CTAP between the PNC and one or multiple devices.

Figure 3:
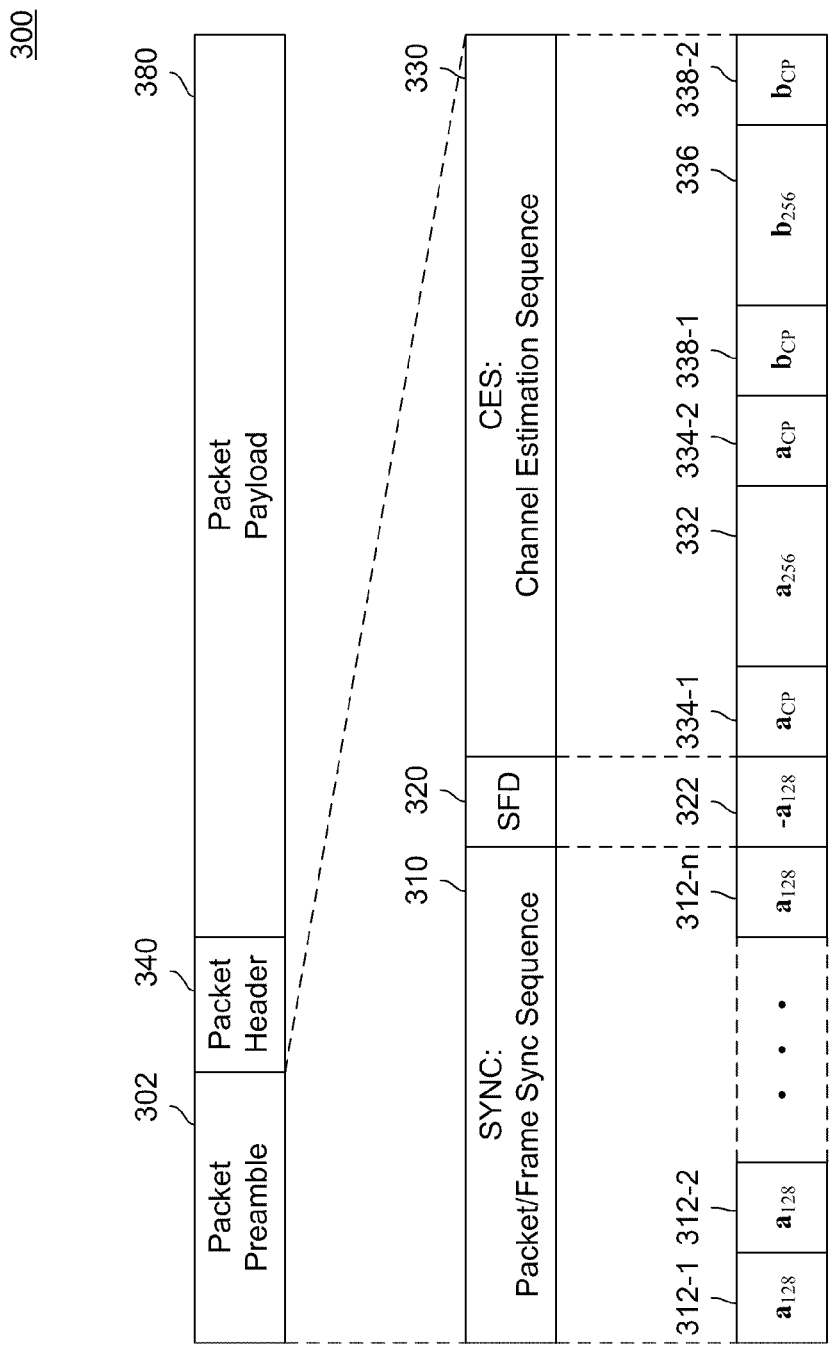
FIG. 3 is a diagram of a frame/packet structure configured in accordance with an aspect of the disclosure that is used in the superframe structure of FIG. 2.

FIG. 3 is an example of a frame structure 300 that may be used for a single carrier, OFDM or common mode frame. As used herein, the term "frame" may also be referred to as a "packet", and these two terms should be considered synonymous. The frame structure 300 includes a preamble 302, a header 340, and a packet payload 380. The common mode uses Golay codes for all three fields, i.e. for the preamble 302, the header 340 and the packet payload 380. The common-mode signal uses Golay spreading codes with chip-level π/2-BPSK modulation to spread the data therein. The header 340, which is a physical layer convergence protocol (PLCP) conforming header, and the packet payload 380, which is a physical layer service data unit (PSDU), includes symbols spread with a Golay code pair of length-64. Various frame parameters, including, by way of example, but without limitation, the number of Golay-code repetitions and the Golay-code lengths, may be adapted in accordance with various aspects of the frame structure 300. In one aspect, Golay codes employed in the preamble may be selected from length-128 or length-256 Golay codes. Golay codes used for data spreading may comprise length-64 or length-128 Golay codes.

Referring back to FIG. 3, the preamble 302 includes a packet sync sequence field 310, a start frame delimiter (SFD) field 320, and a channel-estimation sequence field 330. The preamble 302 may be shortened when higher data rates are used. For example, the default preamble length may be set to 36 Golay codes for the common mode, which is associated with a data rate on the order of 50 Mbps. For a data rate in the order of 1.5 Gbps data rate, the preamble 302 may be shortened to 16 Golay codes, and for data rates around 3 Gbps, the preamble 302 may be further shortened to 8 Golay codes. The preamble 302 may also be switched to a shorter preamble based upon either an implicit or explicit request from a device.

The packet sync sequence field 310 is a repetition of ones spread by one of the length-128 complementary Golay codes ($a^i_{128}$, $b^i_{128}$) as represented by codes 312-1 to 312-$n$ in FIG. 3. The SFD field 320 comprises a specific code such as $\{-1\}$ that is spread by one of the length-128 complementary Golay codes ($a^i_{128}$, $b^i_{128}$), as represented by a code 322 in FIG. 3. The CES field 330 may be spread using a pair of length-256 complementary Golay codes ($a^i_{256}$, $b^i_{256}$), as represented by codes 332 and 336, and may further comprise at least one cyclic prefix, as represented by 334-1 and 338-1, such as $a^i_{CP}$ or $b^i_{CP}$ which are length-128 Golay codes, where CP is the Cyclic Prefix or Postfix. A cyclic postfix for each of the codes 332 and 336, such as $a^i_{CP}$ or $b^i_{CP}$ respectively, as represented by 334-2 and 338-2, respectively, are length-128 Golay codes.

In one aspect, the header 340 employs approximately a rate one-half Reed Solomon (RS) coding, whereas the packet payload 380 employs a rate-0.937 RS coding, RS(255,239). The header 340 and the packet payload 380 may be binary or complex-valued, and spread using length-64 complementary Golay codes $a^i_{64}$ and/or $b^i_{64}$. Preferably, the header 340 should be transmitted in a more robust manner than the packet payload 380 to minimize packet error rate due to header error rate. For example, the header 340 can be provided with 4 dB to 6 dB higher coding gain than the data portion in the packet payload 380. The header rate may also be adapted in response to changes in the data rate. For example, for a range of data rates up to 1.5 Gbps, the header rate may be 400 Mbps. For data rates of 3 Gbps, the header rate may be 800 Mbps, and for a range of data rates up to 6 Gbps, the header rate may be set at 1.5 Gbps. A constant proportion of header rate may be maintained to a range of data rates. Thus, as the data rate is varied from one range to another, the header rate may be adjusted to maintain a constant ratio of header rate to data-rate range. It is important to communicate the change in header rate to each device in the plurality of DEVs 120 in the network 100. However, the current frame structure 300 in FIG. 3 used by all modes (i.e., single carrier, OFDM and common modes), do not include an ability to do this.

Figure 4:
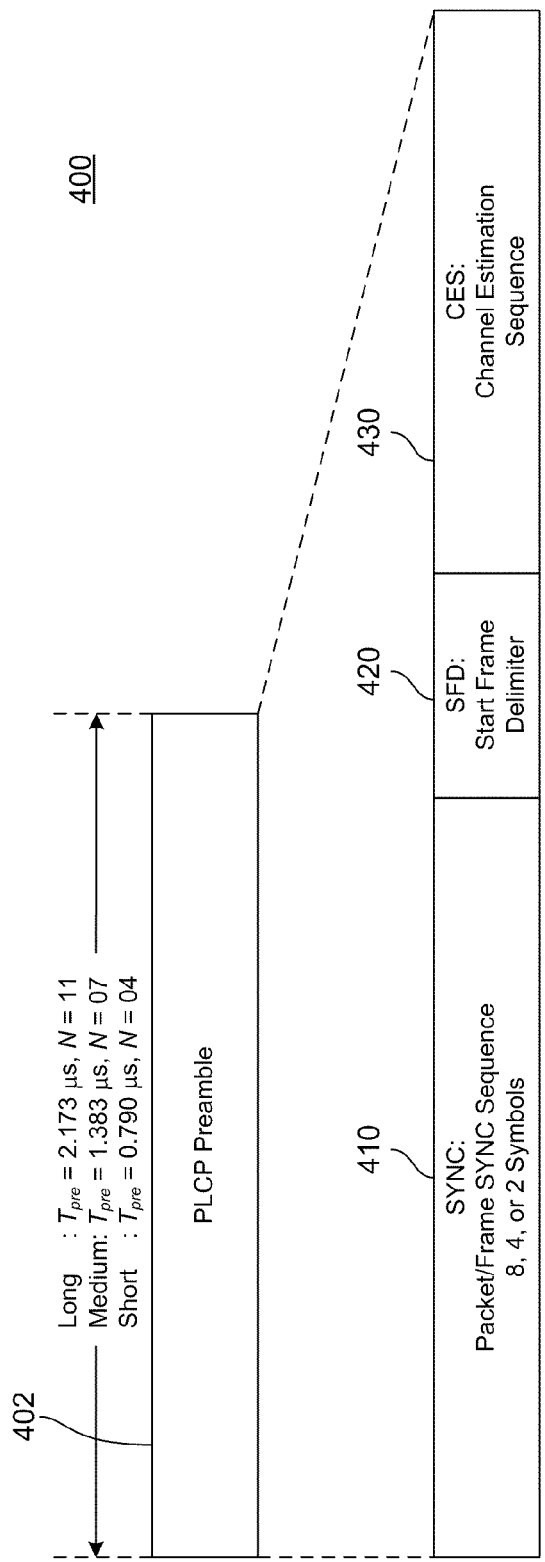
FIG. 4 is a structure diagram of a preamble having various lengths in accordance with an aspect of the disclosure.

FIG. 4 illustrates a preamble 400 in accordance with aspects of the disclosure. Three preambles are defined as follows:

Long preamble: 8 sync symbols, 1 SFD symbol, 2 CES symbols;

Medium preamble: 4 sync symbols, 1 SFD symbol, 2 CES symbols; and

Short preamble: 2 sync symbols, 1 SFD symbol, 1 CES symbol;

where a symbol is a Golay code of length 512 and may be constructed from either a single or a pair of length 128 Golay codes.

During the beacon period, beacons with quasi-omni patterns, i.e. patterns that cover a relatively broad area of the region of space of interest, referred to as "Q-omni" beacons, are first transmitted. Directional beacons—that is, beacons transmitted using higher antenna gain in some direction(s) may additionally be transmitted during the beacon period or in the CTAP between PNC and one or more devices. A unique preamble sequence set may be assigned to each piconet within the same frequency channel, such as to improve frequency and spatial reuse:

$$s_{512,m}[n]=c_{4,m}[\text{floor}(n/128)] \times u_{128,m}[n \bmod 128] \quad n=0:511,$$

where the base sequences $s_{512,m}$ occupy four non-overlapping frequency-bin sets, and therefore, are orthogonal in both time and frequency. The $m^{th}$ base sequence occupies frequency bins m, m+4, m+8, m+12, . . . . In one aspect of the disclosure, modified Golay sequences are generated from other Golay sequences, such as regular Golay complementary sequences, using time- or frequency-domain filtering to ensure that only the used subcarriers are populated rather than the entire 512 subcarriers.

The term "regular Golay complementary sequences," as used herein, and denoted by a and b, may be generated using the following parameters:
1. A delay vector D of length M with distinct elements from the set 2 m with m=0:M−1; and
2. A seed vector W of length M with elements from the QPSK constellation (±1,±j)

Figure 20:
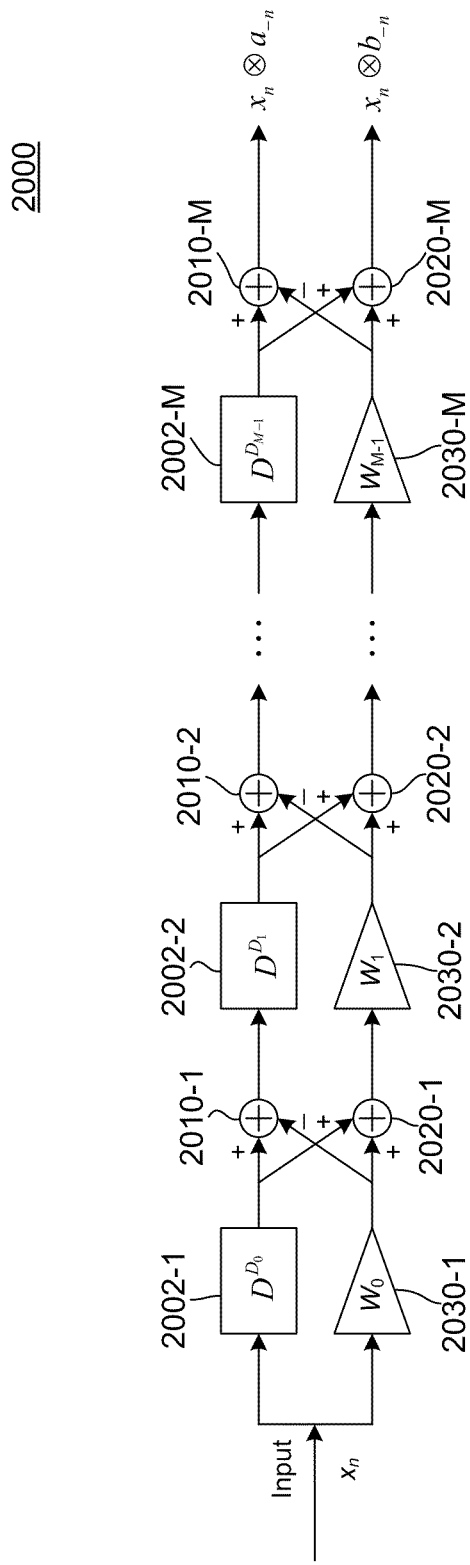
FIG. 20 is a block diagram of a Golay-code circuitry configured in accordance with one aspect of the disclosure.

FIG. 20 illustrates a Golay-code circuitry 2000 that may be employed either as a Golay code generator or a matched filter in some aspects of the disclosure. The Golay-code circuitry 2000 includes a sequence of delay elements 2002-1 to 2002-M configured for providing a determined set of fixed delays D=[D(0), D(1), . . . , D(M−1)] to a first input signal. The delay profile provided by the delay elements 2002-1 to 2002-M may be fixed, even when the Golay-code circuitry 2000 is configured to produce multiple Golay complementary code pairs. The Golay-code circuitry 2000 also includes a sequence of adaptable seed vector insertion elements 2030-1 to 2030-M configured for multiplying a second input signal by at least one of a plurality of different seed vectors $W^i$=[W(0), W(1), . . . , W(M−1)] to generate a plurality of seed signals. The output from each of the sequence of adaptable seed vector insertion elements 2030-1 to 2030-M is fed into a first set of combiners 2010-1 to 2010-M to be combined with a respective output of each of the delay elements 2002-1 to 2002-M. In the implementation of the Golay-code circuitry 2000 as shown in FIG. 20, the output of each seed vector insertion element 2030-1 to 2030-M is added to the output of its respective delay elements 2002-1 to 2002-M by a respective one of the first set of combiners 2010-1 to 2010-M before the results then being fed to the next stage. A second set of combiners 2020-1 to 2020-M is configured for combining the delayed signals from the delay elements 2002-1 to 2002-M with signals multiplied by the seed vector, where the seed signals are subtracted from the delay signals in the Golay-code circuitry 2000.

Receivers implemented in accordance with certain aspects of the disclosure may employ similar Golay-code generators to perform matched filtering of received signals so as to provide for such functionality as packet or frame detection.

In one aspect, Golay codes (a1, a2, a3, and a4) may be generated by combinations of Delay vectors (D1, D2, D3, and D4) and corresponding seed vectors (W1, W2, W3, and W4), as shown in the following table:

| Delay and Seed Vectors for Golay sequences a1, a2, a3 & a4 | | | | | | | |
|---|---|---|---|---|---|---|---|
| D1 | 64 | 32 | 8 | 1 | 4 | 2 | 16 |
| D2 | 64 | 32 | 8 | 1 | 4 | 2 | 16 |
| D3 | 64 | 32 | 4 | 2 | 8 | 1 | 16 |
| D4 | 64 | 32 | 4 | 2 | 8 | 1 | 16 |
| W1 | −1 | −j | −1 | −j | −1 | 1 | 1 |
| W2 | −1 | −1 | 1 | +j | 1 | −j | 1 |
| W3 | −1 | −1 | −1 | −1 | 1 | +j | 1 |
| W4 | −1 | −1 | 1 | −1 | 1 | −j | 1 | a or b
0
0
1
0

The first, second, and fourth sequences are type a, whereas the third sequence is type b. Preferred sequences are optimized to have minimum sidelobe levels as well as minimum cross-correlation.

In some aspects of the disclosure, a base rate may be employed for OFDM signaling operations used for exchanging control frames and command frames, associating to a piconet, beamforming, and other control functions. The base rate is employed for achieving optimal range. In one aspect, 336 data subcarriers per symbol may be employed with frequency-domain spreading to achieve the base data rate. The 336 subcarriers (subcarriers −176 to 176) may be divided into 4 non-overlapping frequency bins, such as described with respect to the preamble, and each set may assigned to one of a plurality of PNCs operating in the same frequency band. For example, a first PNC may be allocated subcarriers −176, −172, −168, . . . , 176. A second PNC may be allocated subcarriers −175, −171, −167, . . . , 173, and so on. Furthermore, each PNC may be configured for scrambling the data to distribute it over multiple subcarriers.

In IEEE 802.15.3, piconet timing is based on a super frame including a beacon period during which a PNC transmits beacon frames, a Contention Access Period (CAP) based on the CSMA/CA protocol, and a Channel Time Allocation Period (CTAP), which is used for Management (MCTA) and regular CTAs, as further explained below.

During the beacon period, beacons with almost omnidirectional antenna patterns, referred to as quasi-omni, or "Q-omni" beacons, are first transmitted. Directional beacons—that is, beacons transmitted using some antenna gain in some direction(s) may additionally be transmitted during the beacon period or in the CTAP between two devices.

In order to reduce overhead when transmitting directional beacons, the preamble may be shortened (e.g., the number of repetitions may be reduced) for higher antenna gains. For example, when an antenna gain of 0-3 dB is provided, the beacons are transmitted using a default preamble comprising eight modified Golay codes of length 512 and two CES symbols. For an antenna gain of 3-6 dB, the beacons employ a shortened preamble of four repetitions of same modified Golay code and two CES symbols. For an antenna gain of 6-9 dB, the beacons transmit a shortened preamble of two repetitions of the same modified Golay code and 1 or 2 CES symbols. For antenna gains of 9 dB or more, the beacon preamble employs only one repetition of the same Golay code and 1 CES symbol. If a header/beacon is used during beaconing or for data packets, the header-data spreading factor may be matched to the antenna gain.

Various aspects of the disclosure provide for a unified messaging protocol that supports a wide range of antenna configurations, beamforming operations, and usage models. For example, antenna configurations may include directional or quasi-omni antennas, directional antenna patterns of a single antenna, diversity-switched antennas, sectored antennas, beamforming antennas, phased antenna arrays, as well as other antenna configurations. Beamforming operations may include proactive beamforming, which is performed between a PNC and a device, and on-demand beamforming, which is performed between two devices. Different usage models for both proactive beamforming and on-demand beamforming include per-packet beamforming from a PNC to multiple devices and from at least one device to the PNC, transmissions from a PNC to only one device, communications between devices, as well as other usage models. Proactive beamforming is useful when the PNC is the data source for one or multiple devices, and the PNC is configured for transmitting packets in different physical directions, each of which corresponding to a location of one or more devices for which packets are destined.

In some aspects, the unified (SC/OFDM) messaging and beamforming protocol is independent of the optimization approach (i.e., optimizing to find the best beam, sector or antenna weights), and antenna system used in the devices in the wireless network 100. This allows for flexibility in the actual optimization approach employed. However, the tools enabling the beamforming should be defined. These tools should support all scenarios while enabling reduced latency, reduced overhead, and fast beamforming.

The following table shows four types of single-carrier beamforming packets that may be employed by aspects of the disclosure.

| Packet Type | Preamble Length (# 128 chips) | Header Rate (Mbps) | Data Rate (Mbps) | Requirement (M)andatory/ (O)ptional |
| --- | --- | --- | --- | --- |
| I | 36 | 50 | 50 | M |
| II | 20 | 100 | 100 | O |
| III | 12 | 200 | 200 | O |
| IV | 8 | 400 | 400 | O |

Since these are single-carrier packets transmitted using the common mode, they can be decoded by both single-carrier and OFDM devices. The majority of transmitted packets may have no body—just a preamble.

The different types of packets may be employed for different antenna gains in such a way as to substantially equalize the total gain of the transmissions, taking into consideration both coding gain and antenna gain. For example, a Q-Omni transmission with 0~3 dB antenna gain may employ type I packets. A directional transmission with 3~6 dB antenna gain may use type II packets. A directional transmission with 6~9 dB antenna gain may use type III packets, and a directional transmission with 9~12 dB antenna gain may uses type IV packets. In another aspect it is advantageous to transmit the beacon at the default rate in order to reduce the processing complexity at the devices and PNC.

Figure 5:
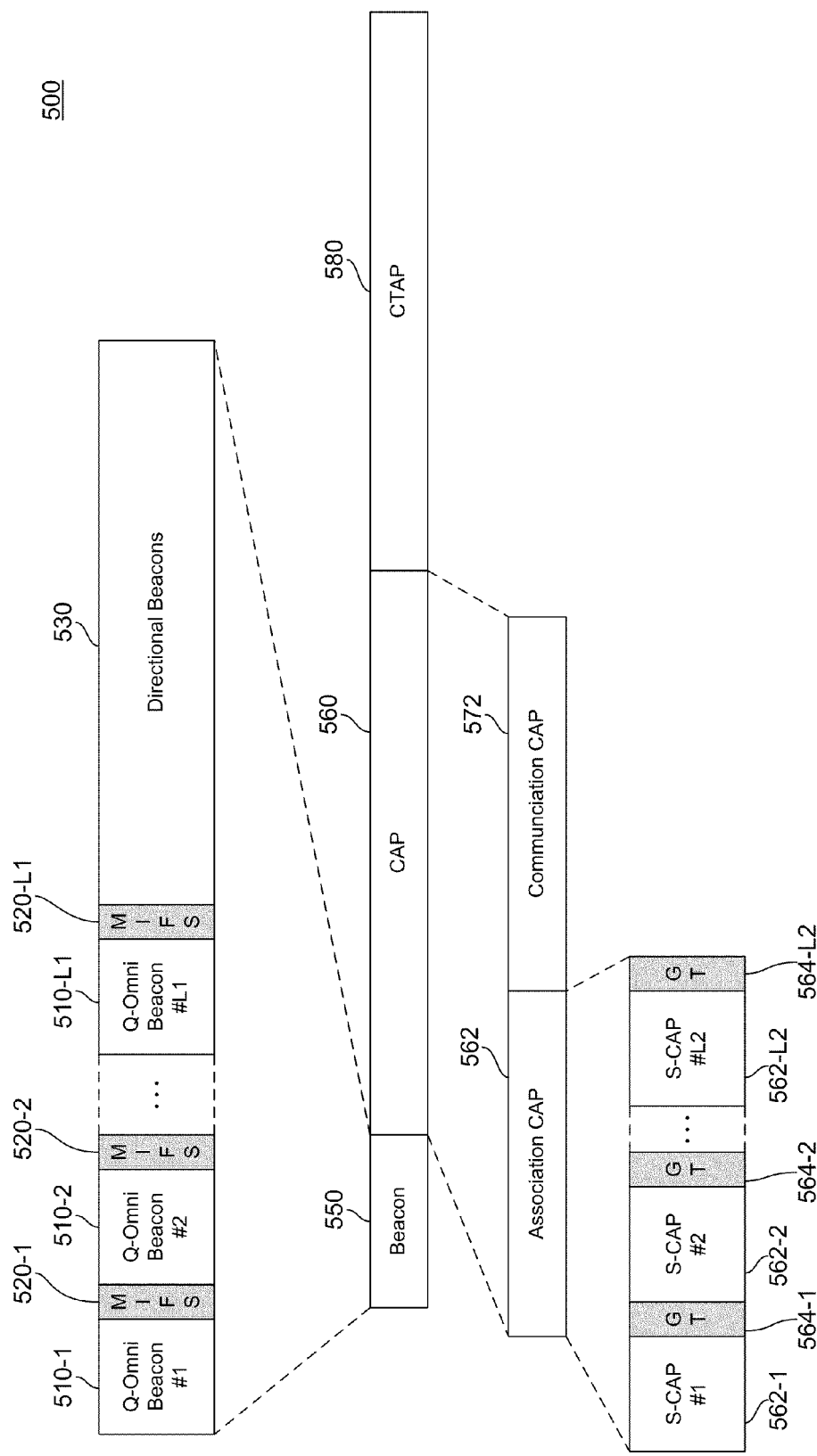
FIG. 5 is a structure diagram of a superframe structure for use in proactive beamforming as configured in accordance with one aspect of the disclosure.

FIG. 5 illustrates a superframe structure 500 that may be employed by various aspects of the disclosure to perform proactive beamforming. The superframe structure 500 includes a beacon portion 550, a CAP 560 based on the CSMA/CA protocol, and CTAP 580, which is used for Management (MCTA) and regular CTAs. The beacon portion 550 includes a Q-Omni portion and a directional portion 530. The directional portion 530 includes the use of directional beacons that can be sent to different devices to convey more information.

The Q-Omni portion includes L1 transmissions in the superframe structure 500, which is a plurality of Q-Omni beacons, as represented by Q-Omni beacons 510-1 to 510-L1, each of which is separated by a respective MIFS (Minimum InterFrame Spacing which is a guard time), as represented by a plurality of MIFS 520-1 to 520-L1. In an aspect, L1 represents the number of Q-Omni directions that the PNC is able to support. For a PNC capable of omnidirectional coverage—that is, a PNC having an omnidirectional-type antenna, L1=1. For a PNC with sectorized antennas, L1 would represent the number of sectors that the PNC is able to support. Similarly, when a PNC is provided with switching transmit diversity antennas, L1 can represent the number of transmit antennas in the PNC. Various approaches to the structure of the Q-omni beacon packet may be used. Thus, for example, the L1 Q-omni beacons carry the same content, with the exception that each Q-omni beacon packet may have one or more counters containing information about the index of the Q-omni beacon packet and the total number of Q-omni beacons packets in the Q-omni portion.

In one aspect, the CAP 560 is divided into two portions, an association CAP period 562 and a data communication CAP 572. The association CAP 562 allows each of the devices to associate itself with the PNC. In one aspect, the association CAP 562 is divided into a plurality of sub-CAPs (S-CAPs), which is represented by S-CAPs 562-1 to 562-L2, each followed by a respective Guard Time (GT), which is represented by GTs 564-1 to 564-L2. L2 represents the maximum number of Q-omni receive directions capable by the PNC, which may be different than L1, and thus, in one aspect of the disclosure, during the association CAP period 562, the PNC will listen in each of the L2 receive directions for an association request from a device, i.e. during the $l^{th}$ S-CAP the PNC will listen in the $l^{th}$ receive direction, where l ranges from 1 to L2.

In an aspect where the channel is reciprocal (e.g., L1 equals L2), during the $l^{th}$ S-CAP, where l can be any value from 1 to L1, the PNC receives from the same antenna direction it used to transmit the $l^{th}$ Q-Omni beacon. A channel is reciprocal between two devices, if the two devices use the same antenna array for transmission and reception. A channel is non-reciprocal if, for example, one of the devices uses different antenna arrays for transmission and reception.

Figure 6A:
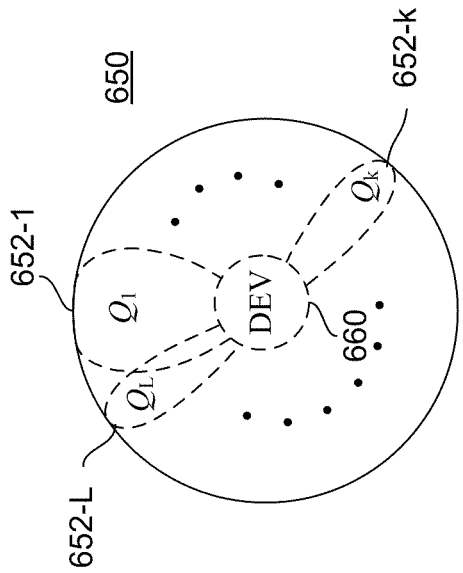
FIGS. 6A and 6B are diagrams illustrating various antenna patterns that may be implemented on devices in the wireless network of FIG. 1 in accordance with an aspect of the disclosure.
Figure 6B:
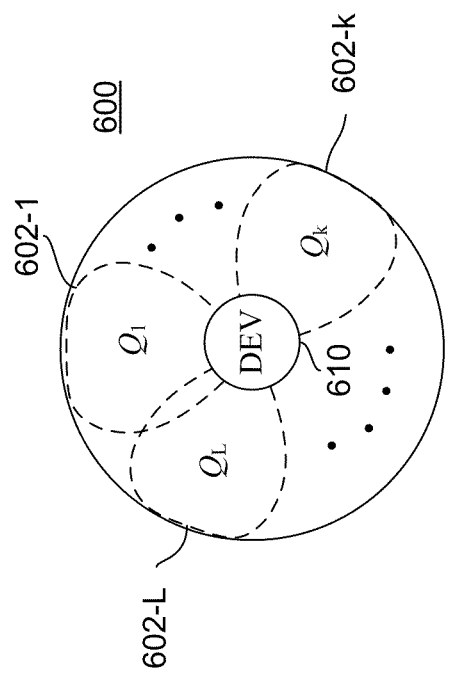

FIGS. 6A and 6B illustrate two example of antenna patterns 600 and 650, respectively. In FIG. 6A, a station 610 includes a plurality of antenna directions 602-1 to 602-L, with a k-th antenna direction 602-k. Similarly, in FIG. 6B, a station 660 includes a plurality of antenna directions 650-1 to 650-L with a k-th antenna direction 650-k. In one aspect, each of the antenna directions may be part of a particular pattern with a resolution referred to herein as Q-Omni, sectors, beams and High Resolution Beams (HRBs). Although the terms used herein refer to antenna directions that are arbitrary in terms of actual resolution (e.g., area of coverage), a Q-Omni pattern may be thought to refer to an antenna pattern that covers a very broad area of a Region of Space of Interest (RSI). In an aspect of the disclosure, a DEV is configured to cover the RSI with a minimal set of, possibly overlapping, Q-omni antenna directions. A sector may refer to a pattern that covers a broad area using for example one fat beam or multiple narrower beams that can be adjacent or not. In an aspect of the disclosure, sectors can overlap. Beams are a subset of High Resolution Beams (HRBs) that are of the highest resolution level. In an aspect of the disclosure, adjustment of the resolution from beams to HRBs is achieved during a tracking operation where a device monitors a set of HRBs around a given beam.

As discussed above, the CAP is based on a CSMA/CA protocol for communication between different devices (DEVs). When one of the DEVs in the piconet is not omnidirection capable, any DEV desiring to communicate with that DEV during the CAP needs to know in which direction to transmit and receive. A non-omnidirection capable DEV can use switched antennas, sectored antennas, and/or phased antenna arrays, referred to here as directional antennas, as further discussed herein. It should be noted that the information broadcast during the beacon can be partitioned between Q-Omni and directional beacons in order to optimize the Q-omni beacon.

As discussed previously, the PNC broadcasts a beacon in every superframe. Each beacon contains all timing information about the superframe and, optionally, information about some or all of the DEVs that are members of the piconet, including the beamforming capabilities of each DEV. The information about the possible capabilities of some or all of the DEVs would preferably be communicated during the directional beacon section of the beacon period because directional beacons are transmitted at higher data rates and would better support the potentially large amounts of DEV capability information. The DEV beamforming capabilities are obtained by the PNC during association. A DEV beamforming capability includes a number of coarse transmit and receive directions and number of beamforming levels. For example, the number of coarse directions could be a number of antennas for a DEV with switched antennas, a number of sectors for a DEV with sectored antennas, or a number of coarse patterns for a DEV with a phase antenna array. A phase antenna array can generate a set of patterns that might be overlapping; each pattern covers a part of the region of the space of interest.

A DEV needs to perform the following steps in order to associate (i.e. becomes a member of the piconet) with the PNC. First, the DEV searches for a beacon from the PNC. The DEV then detects at least one of the Q-omni beacons and acquires knowledge of the superframe timing, number of Q-omni beacons, number and duration of S-CAPs, and, optionally, the possible capabilities of each of the DEV members. In an aspect of the disclosure, the DEV will acquire and track the best PNC directions by measuring a link quality indicator from all Q-omni beacons transmitted by the PNC. In one aspect of the disclosure, the Link quality indicator (LQI) is a metric of the quality of the received signal. Examples of LQI include but not limited to RSSI (Received Signal Strength Indicator), SNR (Signal to Noise Ratio), SNIR (Signal to Noise and Interference Ratio), SIR (Signal to Interference Ratio), preamble detection, BER (Bit Error Rate), or PER (Packet Error Rate).

The DEV sends an association request to the PNC in one of the S-CAPs by sweeping over its set of L1 transmit directions, i.e. the DEV sends an association request comprising a set of L1 packets separated optionally by a guard interval, where the $m^{th}$ packet (m=1, 2, . . . , L1) is sent in the DEV's transmit direction and where the packets contain the same content, with the exception that each packet may have in its header one or more counters containing information about the total number of packets in the association request and the index of the current packet. Alternatively, each packet may have in its header the number of remaining packets in the association request. Furthermore, each association request (i.e., each packet in the association request) has information to the PNC about its best transmit direction toward the DEV. This information is known to the DEV from beaconing. After sending the association request, the DEV then waits for an association response.

Upon detection of one of the packets that has been sent by the DEV, the PNC decodes information from the header about the remaining number of packets within the association request and is able to compute the time left until the end of the last packet, i.e., the time that it should wait before transmitting back the association response. The association response from the PNC should inform the DEV about its best transmit direction. Once an association response is received successfully by the DEV, the DEV and the PNC will be able to communicate through a set of directions: one from the DEV to the PNC and one from the PNC to the DEV, referred to a "working set of directions", and will use this working set for further communication in the S-CAP. Thus, in one aspect of the disclosure, having a working set of directions means that the DEV knows which direction to use to transmit to the PNC and which S-CAP to target, and the PNC knows which transmit direction to use toward the DEV. A working set of directions does not necessarily mean the best set of directions between the PNC and the DEV. For example, a working direction can be the first direction detected during the sweep with sufficient link quality to allow the completion of the reception of the packet. The working set of directions can be determined to be the preferred or "best" set of directions by using a polling technique described below. Alternatively, upon successful detection of one of the packet within the association request, the PNC may monitor all remaining packets (transmitted in different directions by the DEV) in order to find the best receive direction from the DEV, in which case the set of directions is now a best set of directions. The PNC may acquire the DEV capabilities (including beamforming capabilities) as part of the association request process or in a CTA allocated for further communication between the PNC and the DEV.

If the DEV does not receive an association response from the PNC within a given time, than the DEV shall resend the association request by trying one or more time in each of the S-CAPs until it successfully receives an association response from the PNC. In one aspect of the disclosure, the PNC allocates only one S-CAP for association requests. A DEV can send an association request by sweeping over all of its transmit directions as described above. Or, where the channel is symmetrical, the DEV can send the PNC the association request using the transmit direction equivalent to the best receive direction from the PNC. This best receive direction from the PNC is available to the DEV from monitoring the beacon as described above. In another aspect of the disclosure, the DEV can send an association request to the PNC in one of the DEV's transmit directions and wait to hear an acknowledgement from the PNC. If the DEV does not receive a response from the PNC, the DEV will send another association request to the PNC in another one of the DEV's transmit direction, either in the same CAP or in the CAP of another superframe. Each association request will include information common to the complete set of association requests, such as how many association packets have been/are being sent in the set of association requests, and unique information of the particular association request being transmitted, such as unique identification information of the actual association request.

The PNC may sweep over all of its receive directions to detect the preamble of any packet within an association request transmitted by the DEV, whether that packet was sent as part of a set of packets in the association request or sent individually. Upon a successful receipt of the association request, the PNC will use the direction information contained therein to transmit information back to the DEV.

Although the PNC may be able to decode the preamble of the packet based on the first association request it is able to receive, the direction from which the DEV transmitted the association request may not be the most optimal direction. Thus, the PNC can attempt to detect additional association request packets to determine if subsequent association requests are better received.

The above-described procedure is a simplified version of a directional association procedure, i.e. when PNC and/or DEV are not omnidirection capable. From the time-to-time, the PNC will poll each DEV to request that the DEV trains the PNC. This is necessary in order for the PNC to track mobile devices. The training may be performed, for example, by the DEV sweeping over its set of transmit directions. The DEV itself does not need to be trained by the PNC because the DEV tracks the PNC direction by monitoring the Q-omni beacons broadcast by the PNC, as described above. In an aspect of the disclosure, if the channel between the PNC and the DEV is reciprocal, than the DEV associates with the PNC without sweeping using the best pair of directions acquired during the beacon period. If, for example, the PNC has four Q-omni beacons (i.e., four directions in which it transmits Q-omni beacons) and the DEV has three receive directions, and the DEV has determined that the best Q-omni beacon from which it receives transmissions from the PNC is the second Q-omni beacon and that its best receive direction is number three, than the DEV would use direction number three to send an association request in S-CAP number two to the PNC, with the association request has information to the PNC about its best Q-omni direction, that is number two. The PNC would than transmit the "association request response" using transmit direction number two corresponding to its receive direction number two.

Assume that DEV-1 is interested in communicating with DEV-2, DEV-3, . . . DEV-N. From the beacon, DEV-1 has learned everything about all other DEVs members of the piconet. In order for DEV-1 to communicate with DEV-2 or DEV-3, . . . DEV-N efficiently in the CAP, since each DEV may have multiple directions of transmission or reception and each DEV does not know which direction to use when transmitting or receiving in the CAP, all of the DEVs that are not omnidirectional that are interested in communicating with each other have to train each other.

In one aspect, the training sequence for DEV-1 is achieved as follows. Assume that DEV-j (j=1, 2, . . . , N) has MT(j) coarse transmit directions and MR(j) coarse receive directions.

1. DEV-1 (or, alternatively, the PNC) computes the maximum number, NR, of coarse receive directions of DEV-2, DEV-3, . . . DEV-N, where:

$NR=\max(MR(2),MR(3),\ldots,MR(N))$

In an aspect of the disclosure, if the PNC is configured to compute the maximum number NR of coarse receive directions of DEV-2, DEV-3, . . . , DEV-N, DEV-1 only needs to transmit the list of devices it is interested in training (e.g., DEV-2, DEV-3, . . . , DEV-N) to the PNC.

2. DEV-1 requests a CTA from the PNC, informing the PNC that it wants to train DEV-2, DEV-3, . . . , DEV-N. In an aspect of the disclosure, training equals locating the best pair of coarse (or fine) transmit and receive directions between DEV-1 and each one of DEV-2, DEV-3, . . . , DEV-N.

3. The CTA duration is computed by DEV-1 (or, alternatively, the PNC) as being at least NR×MT(1)×T, where T is the duration of the training packet, including guard time. The CTA duration may also include a duration for a feedback stage. If the PNC computes the CTA duration, DEV-1 only needs to transmit the list of devices to be trained (e.g., DEV-2, DEV-3, . . . , DEV-N).

4. The PNC allocates (i.e., grants) a CTA for DEV-1 for the training.

5. PNC broadcasts in the beacon the CTA allocation indicating that the source is DEV-1, and the destination is either broadcast (if all devices are to be trained) or a destination group including DEV-2, DEV-3, DEV-N (if only a subset of the devices are to be trained).

Figure 7:
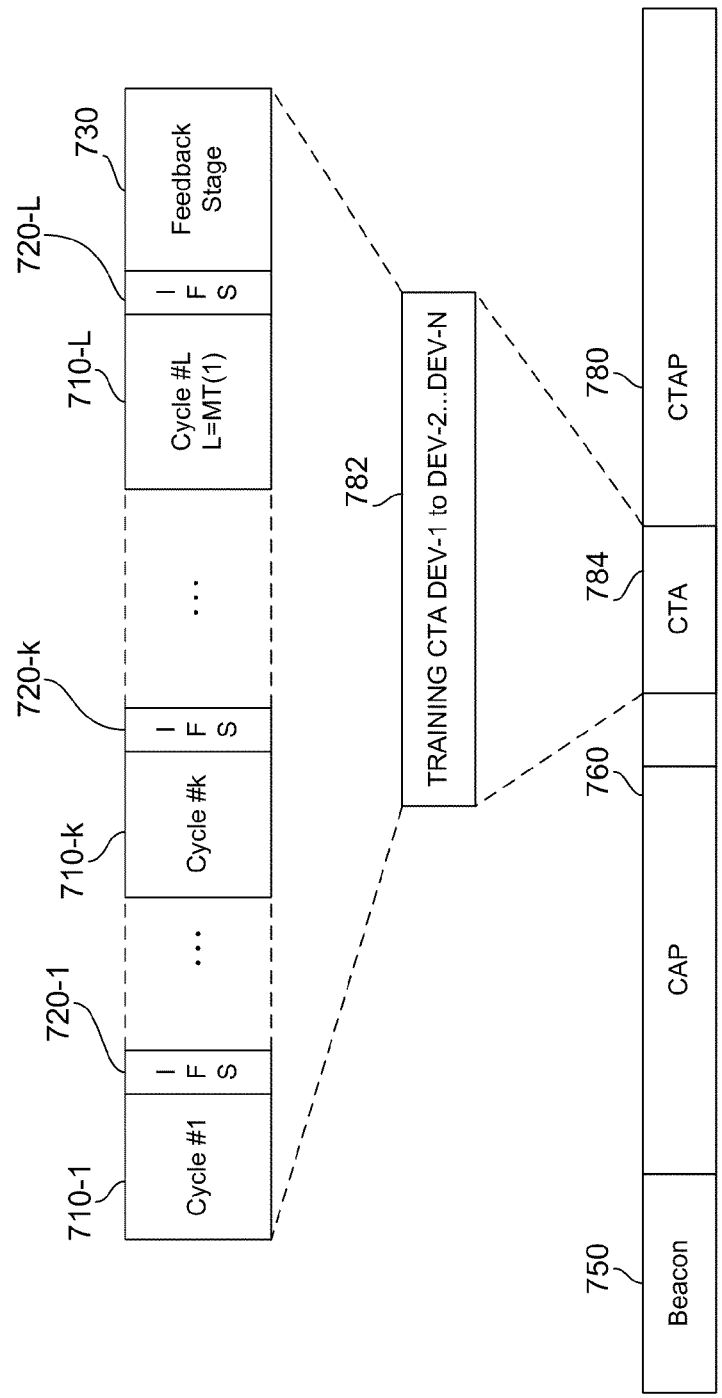
FIG. 7 is a block diagram of a superframe structure for a training sequence, configured in accordance with an aspect of the disclosure, used by a device in the wireless network of FIG. 1 to train other devices of interest.

6. DEV-1 transmits the training packets during the allocated CTA, and DEV-2, DEV-3, . . . , DEV-N should receive the training during the CTA, as illustrated in FIG. 7.

It should be noted that, in one aspect of the disclosure, although coarse directions are mentioned, the directions may also be fine directions, in which smaller separations are made between directions.

Each Q-Omni beacon may carry a beamforming information element 2140, such as shown in FIG. 21A to convey the structure of the beamforming beacons to all devices listening to the PNC. Once a device decodes any one of the Q-omni beacons during any superframe, it is capable of understanding the entire beamforming cycle. In one aspect, the beamforming information element 2140 includes a current Q-omni beacon ID field 2150, a number of Q-omni beacons (e.g., the value L1 from the frame structure 500 of FIG. 5) field 2152, a length field 2154 containing the number of octets in the information element, and an element ID field 2156, which is the identifier of the information element. The current Q-omni beacon ID field 2150 contains a number identifying the number/position of the current Q-omni beacon being transmitted in the current superframe with respect to the number of Q-omni beacons field 2152 in the superframe. A device, using the number contained in the current Q-omni beacon ID field 2150, will know which Q-omni direction from which it heard the beacon.

FIG. 21B illustrates a superframe information element 2160 that is transmitted with the beamforming information element 2140, and includes a PNC address field 2162, a PNC response field 2164, a piconet mode 2166, a maximum transmission power level 2168, a S-CAP duration field 2170, a number of S-CAP periods field 2172, a CAP end time field 2174, a superframe duration field 2176, and a time token 2178.

Figure 22:
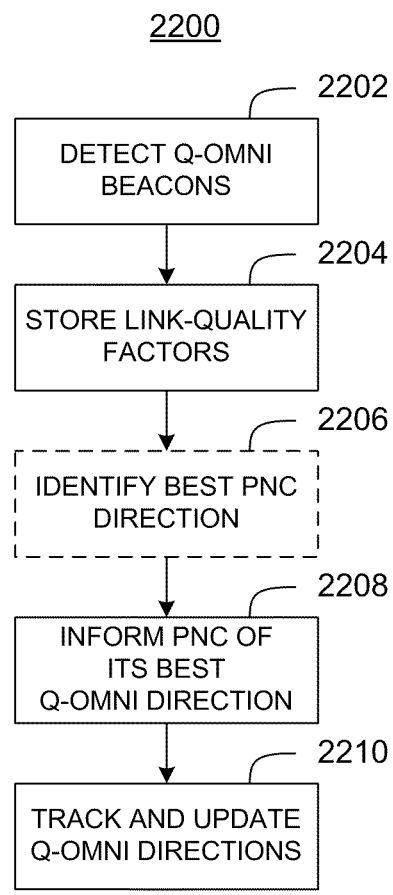

FIG. 22 illustrates an approach for a beamforming operation by devices in accordance with various aspect of the disclosure. FIG. 22 is directed to a beamforming process 2200 of a device with omnidirectional receive capabilities. In step 2202, the omnidirectional device only need to detect the Q-omni beacons of one superframe. If the device is not omnidirectional, the device needs to sweep over all its received directions by listening to one or more superframes to detect the beacon. Upon detection of the Q-omni beacons, the device stores a Link-Quality Factor (LQF) in step 2204 for each of the Q-omni beacons. Then, in step 2206, the device sorts the L LQFs, [LQF(1), . . . , LQF(L)], and identifies the best PNC direction 1 corresponding to the highest LQF:

$1=\arg\{\max[LQF(i)]\}$ $i=1:L$

In one aspect, the LQF is based on at least one of a signal strength, a signal to noise ratio, and a signal to noise and interference ratio. In another aspect, the LQF could also be based on any combination of the aforementioned factors.

In step 2208, the device associates itself with the PNC during the $1^{th}$ CAP of the current superframe, and in step 2210 informs the PNC that all further communications should occur with the PNC using its $1^{th}$ Q-omni direction. The device may still track the set of L best directions by monitoring the corresponding S-omni beacons every Q superframes. If a direction (e.g., the $r^{th}$ S-omni direction) is found with a better LQF, the device may inform the PNC to transmit the next packet using the $r^{th}$ S-omni direction by encoding it in the "NEXT DIRECTION" field in the PHY header.

On-demand beamforming may be performed between two devices, or between a PNC and one device. In one aspect of the disclosure, on-demand beamforming is conducted in the CTA allocated to the link between two devices. When a device is communicating with multiple devices, the same messaging protocol as the proactive beamforming messaging protocol is used. In this case, the CTA will play the role of the beacon period during the beamforming phase, and will be used for data communication thereafter. In the case where only two devices are communicating, since the CTA is a direct link between them, it is possible to employ a more collaborative and interactive on-demand beamforming messaging protocol.

FIG. 7 illustrates a superframe structure 700 having a beacon 750, a CAP 760, and a CTAP 780. The superframe structure 700 illustrates a training sequence where DEV-1 has requested an allocation for the purposes of training DEV-2, DEV-3, ..., DEV-N, and the PNC has granted a CTA 784 to DEV-1 to perform the training. During the CTA 784, DEV-1 trains DEV-2, DEV-3, ..., DEV-N using L cycles 730-1 to 730-L, where L=MT(1), the total number of coarse transmit directions of DEV-1. Each cycle is followed by a respective inter-frame spacing (IFS) (i.e., guard time) 720-1 to 720-L. In one aspect, a feedback stage 730 is included, during which the results of the training is sent back to DEV-1 from DEV-2, DEV-3, ..., DEV-N, as further described herein.

In an aspect, during each cycle, DEV-1 transmits a number n of training packets in a particular coarse transmit direction, where n=NR, the number of coarse receive directions of a DEV, from all devices DEV-2, DEV-3, ..., DEV-N, that has the largest number of coarse receive directions. For example, if DEV-4 has three (3) coarse receive directions, which are equal to or larger than any of the number of coarse receive directions of the other DEVs in DEV-2, DEV-3, DEV-5 ... DEV-N, then n=NR=3. Thus, DEV-1 will transmit three (3) training packets. This repetitive transmission allows all DEVs DEV-2, DEV-3, ... DEV-N to sweep through their coarse receive directions. In other words, DEV-1 has to transmit enough training packets during each cycle to enable all devices to attempt to detect a training packet over all of their respective coarse training directions.

Figure 8:
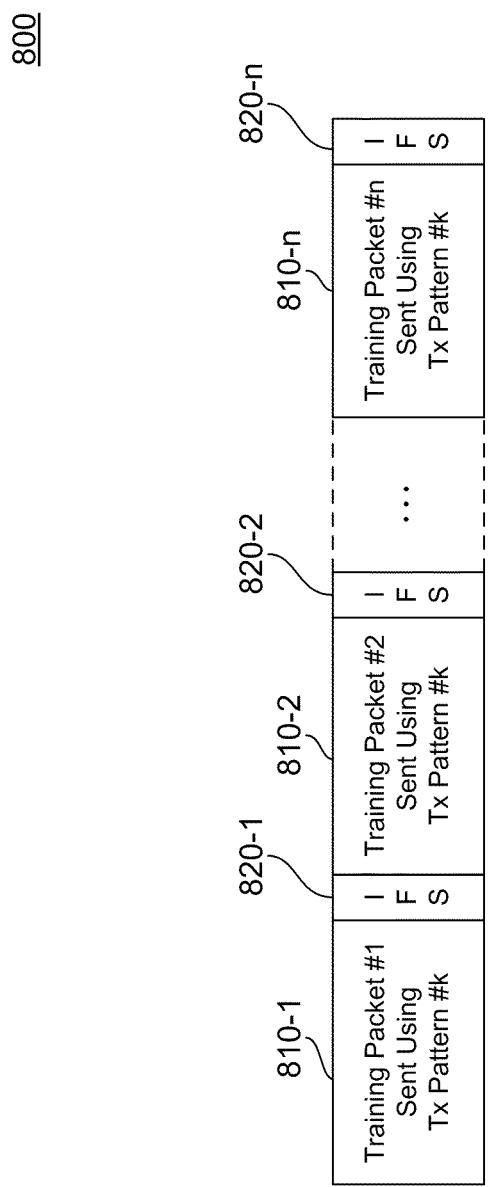
FIG. 8 is a block diagram of a frame structure used during a general training cycle in the training sequence of FIG. 7 as configured in accordance with an aspect of the disclosure.

FIG. 8 illustrates a series of transmissions 800 for a generalized cycle, cycle #k, during the training by DEV-1 of DEV-2, DEV-3, ..., DEV-N. The illustration of the transmission of the n training packets for cycle #k is shown as transmissions 810-1 to 810-n. Each transmission is followed by a respective IFS (i.e., guard time) 820-1 to 820-n. In one aspect, each training packet is identical. As discussed above, the number n of training packets is equal to NR, the largest number of training directions of all the DEVs to be trained. Various approaches to the structure of the training packet may be used. Thus, for example, if the training packets include the preamble portion only (i.e., no header or payload portions), then the set of n training packets within a cycle can be configured into a single large training packet.

In one aspect of the disclosure, the total length the single large training packet would be identical in length to the length of time it would take to transmit multiple preamble-only packets, including the IFS or other inter-packet spacing. For example, to achieve the same length, the single large training packet can include more repetitive sequences to fill the portion normally taken by the IFS. Using a single large training packet approach provide more flexibility to the devices being trained as there is more time overall for detection and reception of the single large training packet. For example, a device being trained may sweep slower (i.e., extend the time the device listens in a particular direction) and have better measurement accuracy because more samples of the preamble are bring captured. As another example, if a device can perform faster sweeps, then the device may complete training and enter into a power-saving mode for the rest of the single large training packet transmission.

Figure 9:
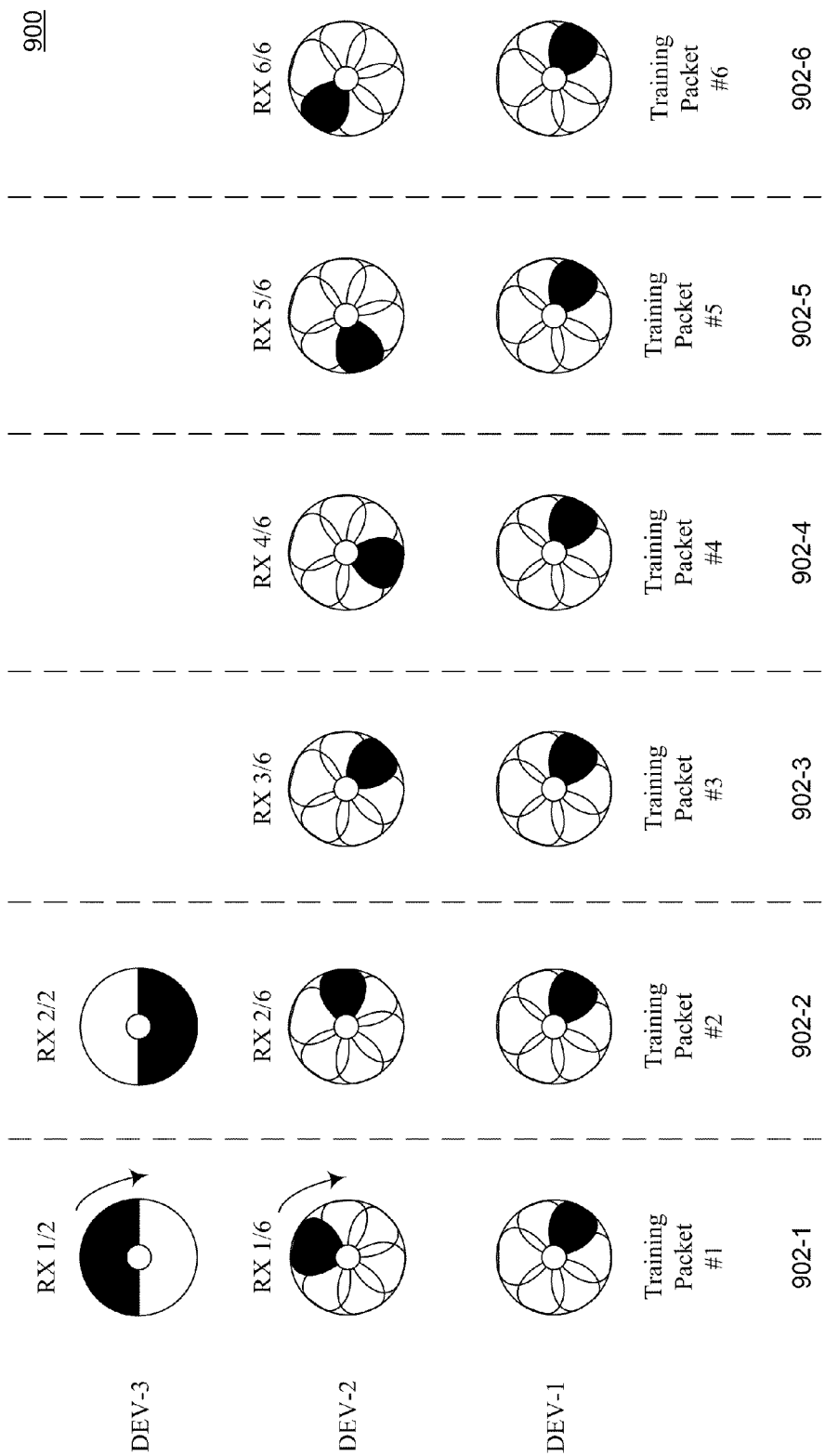
FIG. 9 is a timing diagram for an example cycle of the training sequence of FIG. 7 as configured in accordance with an aspect of the disclosure.

FIG. 9 illustrates an example of one cycle of a training sequence for a DEV-1 that has six (6) transmit directions, a DEV-2 that has six (6) receive directions, and a DEV-3 that has two (2) receive directions. As shown, during each cycle, the DEV-1 transmits a series of six training packets #1 to #6, all in the same direction for DEV-1, one at a time during a period 902-1 to 902-6, respectively. Each of the other DEV's, DEV-2 and DEV-3, will listen for one of the training packets sent by DEV-1 using a different receive direction during each period. For example, as can be seen for DEV-2, during period 902-1, DEV-2 will listen for training packet #1 from DEV-1 in a receive direction 1 of 6 (RX 1/6) and DEV-3 will listen for training packet #1 from DEV-1 in a receive direction 1 of 2 (RX 1/2). In period 902-2, DEV-2 will listen for training packet #2 from DEV-1 in a receive direction 2 of 6 (RX 2/6) and DEV-3 will listen for training packet #2 from DEV-1 in a receive direction 2 of 2 (RX 2/2). Presumably, DEV-3 will have heard training packet #1 from DEV-1 during period 902-1, and identify that its best receive direction is RX 1/2. In period 902-3 through period 902-6, DEV-2 will continue to listen for the training packets from DEV-1 in the respective receive directions indicated. However, DEV-3 may stop listen for the training packets from DEV-1 as it has exhausted all the possible receive directions. During period 902-6, DEV-2 will hear training packet #6 from DEV-1 and thus identify its best receive direction for receiving transmission from DEV-1 is RX 6/6. It should be noted that although the sweeping performed by each DEV-2 and DEV-3 are in a clockwise fashion, no specific pattern needs to be followed by any of the DEV's in terms of direction or sequence of sweeping of antenna directions. It should be noted that the best receive direction found by DEV-2 is only an illustration of the best found during a cycle and is not necessarily the overall best receive direction as the search for the best has to be over all six cycles from DEV-1.

Figure 10:
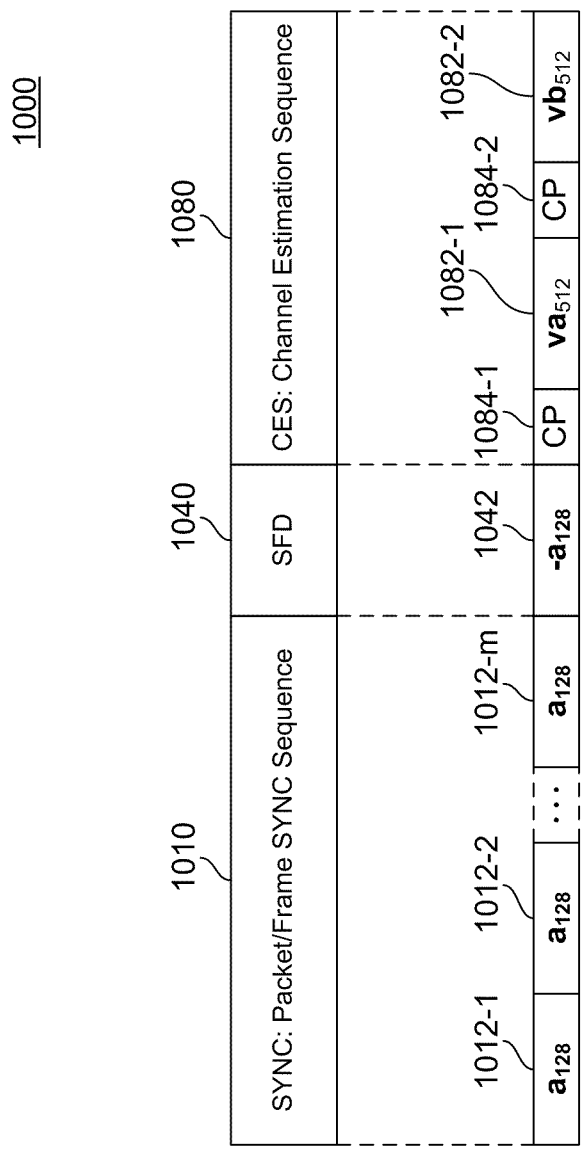
FIG. 10 is a packet structure for a training packet used during the general training cycle.

FIG. 10 illustrates a training packet structure 1000 configured in accordance with an aspect of the disclosure that may be transmitted by a training DEV, where the training packet structure 1000 simply includes a preamble portion without a frame body. If a frame body to be included it should comprise the source address, i.e. the address of DEV-1 and optionally the destination(s) addresses. The training packet structure 1000 includes a packet sync (SYNC) sequence field 1010, a start frame delimiter (SFD) field 1040, and a channel-estimation sequence (CES) field 1080. In one aspect, the SYNC sequence field 1010 includes a repeating pattern of length 128 Golay sequences, while the CES field 1080 includes a pair of complementary modified Golay sequences va 1082-1 and vb 1082-2 produced from two length-512 complementary Golay sequences a and b, which may be constructed from the length 128 Golay sequences. The SYNC sequence field 1010 is separated from the CES field 1080 by the SFD field 1040, which includes a Golay sequence pattern that breaks the repetition of the SYNC sequence field 1010. The SFD field is optional as the CES can play a dual role. Optionally, a header portion may be included that includes at least the source address and, optionally, all destination addresses. As discussed herein, the set of n training packets within a cycle can be configured into a single large training packet constructed, by way of example and not limitation, of a very long SYNC field, which in one aspect of the disclosure a repeating pattern of the length 128 Golay sequence m multiplied by n times.

Figure 11:
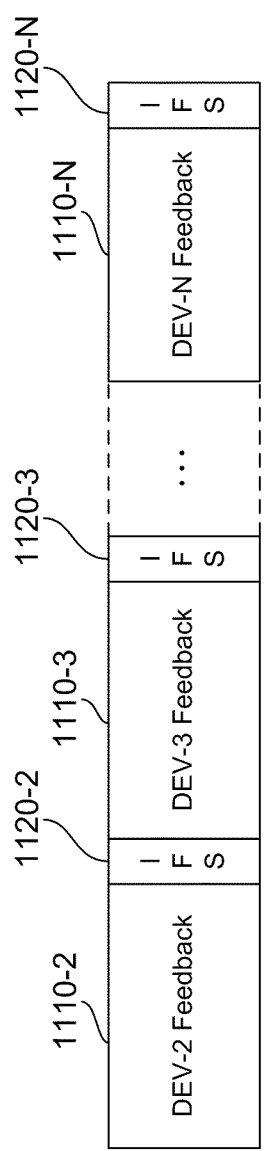
FIG. 11 is a frame structure for a feedback stage of the training sequence of FIG. 7 configured in an aspect of the disclosure.

As discussed above, returning to reference FIG. 7, during the feedback stage 730, each of DEV-2, DEV-3, . . . , DEV-N informs DEV-1 of DEV-1's best coarse transmit direction and optionally its best coarse receive direction. As there are N total devices DEV-1, DEV-2, DEV-3, . . . , DEV-N, there are N-1 feedbacks, one per DEV-j (j)=2, . . . , N). A frame sequence 1100 for achieving the feedback from each DEV is illustrated in FIG. 11, which includes a feedback portion shown as a DEV-2 feedback 1110-2 to a DEV-N feedback 1110-N. Each feedback portion is followed by an IFS 1120-2 through 1120-N. In an aspect of the disclosure, where DEV-1 is not omnidirectional in its reception, DEV-1 will have to listen in each of its possible receive directions for feedback from each of the DEV's. For example, DEV-1 will sweep through all possible reception directions while each of the DEV's DEV-2, DEV-3, . . . , DEV-N transmits their feedback to DEV-1. In an aspect of the disclosure, this method of feedback works optimally if the channel between DEV-1 and each of the DEVs is reciprocal, or if each of the DEVs is omni-capable on transmission. If the channel between DEV-1 to any DEV is reciprocal, the best direction from DEV-1 to that DEV will be used to provide feedback from that DEV to DEV-1. In the case where the DEVs are not omni-capable on transmission or if the channel is not reciprocal, it is preferable for DEV-1 to train each of DEV-2, DEV-3, . . . DEV-N individually. In an aspect of the disclosure, for example, a training session between DEV1-1 and DEV-2 would include a training sweep from DEV-1 to DEV-2 in L1 cycles (L1 is the number of DEV-1 transmit directions) followed by a training sweeping from DEV2- to DEV-1 in L2 cycles (L2 is the number of DEV-2 transmit directions) followed by feedback in a sweep from DEV-1 to DEV-2 followed by a feedback from DEV-2 to DEV-1. It should be noted that one of the feedbacks can be integrated with the sweep training. Various approaches to the feeding back may be used. Thus, for example, if the channel is reciprocal and DEV-1 has trained DEV-2 and DEV-3, then it might not be necessary for DEV-2 and DEV-3 to train back DEV-1 since the path from DEV-1 to DEV-2 is the same as the path from DEV-2 back to DEV-1, and the path from DEV-1 to DEV-3 is the same as the path from DEV-3 back to DEV-1. Alternatively, if every device trains all other devices in the list, then the feedback stage can be omitted if the channel is reciprocal.

At the end of the training sequence, each DEV from DEV-2, DEV-3, . . . , DEV-N will have determined a respective best transmit coarse direction from DEV-1 and its own best coarse receive direction. In other words, at the end of the training sequence, each DEV from DEV-2, DEV-3, . . . , DEV-N can identify the best coarse direction from which DEV-1 should transmit, as well as the best coarse direction from which the particular DEV should listen (i.e., receive the transmission).

After DEV-1 has performed its training, the other DEVs (DEV-2, DEV-3, DEV-N) will request their own CTA from the PNC for the same training purposes. At the end of all training, each pair of DEVs (DEV-1, DEV-2, DEV-3, . . . , DEV-N) will have determined the best pair of coarse directions in both forward and reverse links.

The result of the training is useful in the transmission of information between each DEV. This is particularly applicable to the CAP in one aspect of the disclosure. Assume DEV-1 wants to transmit a packet to DEV-2 during a particular CAP. DEV-1 knows which direction to use to transmit to DEV-2. However, DEV-2 does not know which DEV is transmitting and therefore cannot direct its antenna in the right direction. To address this, in one aspect DEV-2 listens for a short period of time in each of its receive direction. In one aspect, the short period of time should be long enough to detect the presence of a preamble, such as the length of time to perform a clear channel assessment (CCA), for example.

Figure 12:
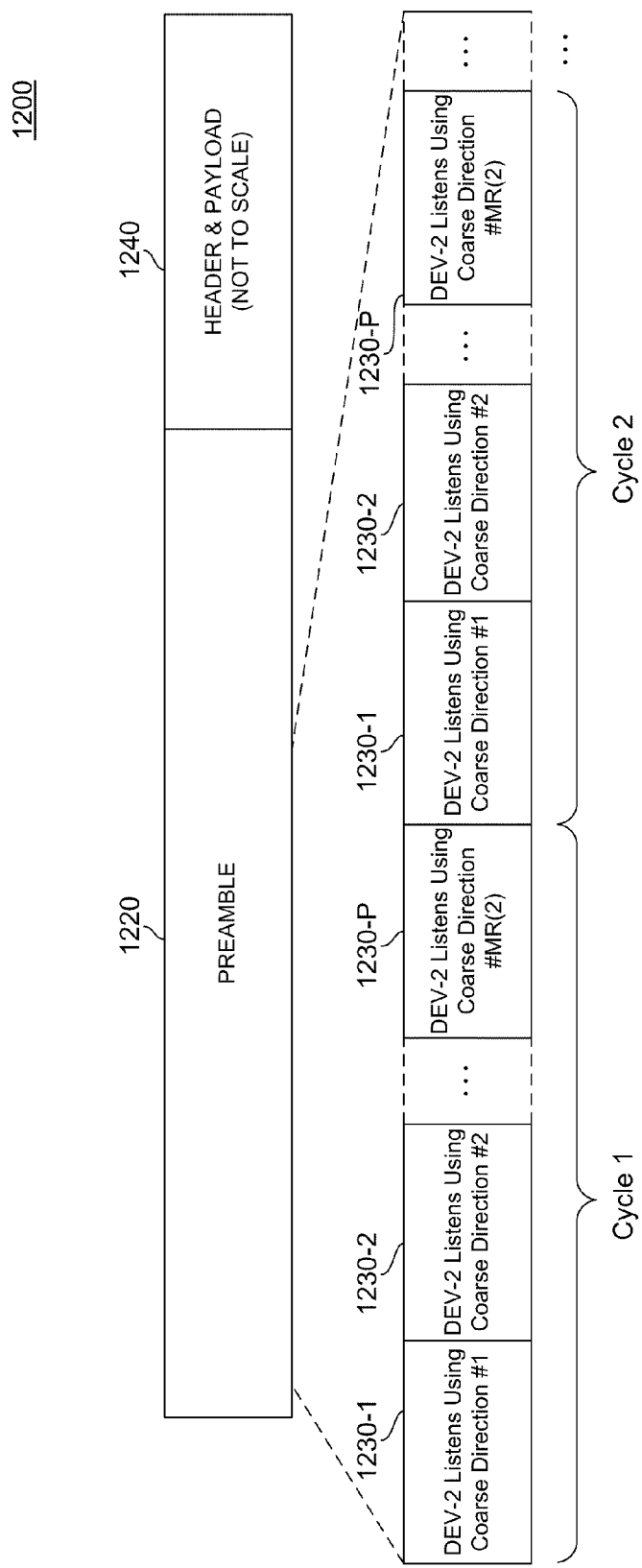
FIG. 12 is a transmitted packet structure and timing description for a device to detect the transmitted packet.

As illustrated in FIG. 12, DEV-2 will continue to switch from one coarse receive direction to another (i.e., sweep through some or all coarse receive directions in each cycle) from coarse receive direction #1 to #P, where P=MR(2), the number of possible coarse receive directions of DEV-2, until it detects the presence of a preamble 1220 from a packet 1200 transmitted from DEV-1. This is illustrated by 1230-1 to 1230-P for each cycle. It should be noted that DEV-2 might sweep over only a subset of its coarse receive directions corresponding to receive directions from potential sources, i.e. a sweep cycle consists of only a subset of the overall receive directions. For example if DEV-2 has done training with only DEV-1 and DEV-3, than DEV-2 might continuously (i.e., multiple cycles) switch between only two coarse receive directions (per cycle) corresponding to best receive directions from DEV-1 and DEV-3 until it detects the preamble or it times out. Once the preamble 1220 is detected, DEV-2 does not need to try the other coarse directions. However, the detection of a preamble does not mean that DEV-2 has acquired its best receive direction. The detection only means that DEV-2 has found a receive direction that minimally allows it to receive the packet. This receive direction is referred to as a working receive direction. As discussed herein, a working direction can be the first direction detected during the sweep with sufficient link quality to allow the completion of the reception of the packet. In one aspect of the disclosure, the transmitting DEV (e.g., DEV-1) can incorporate the best receive direction of DEV-2 in a header 1240 of the packet 1200. In anther aspect, as both DEV-1 and DEV-2 have determined the best pairs of transmit and receive coarse directions for each other during the training period, DEV-2 should be able to determine the best coarse receive direction once it has determined the DEV that is trying to send it the packet, which in this case is DEV-1. Either way, once DEV-2 decodes the header of the packet sent by DEV-1, it knows its best receive direction and can switch to that direction to receive the packet.

Figure 13:
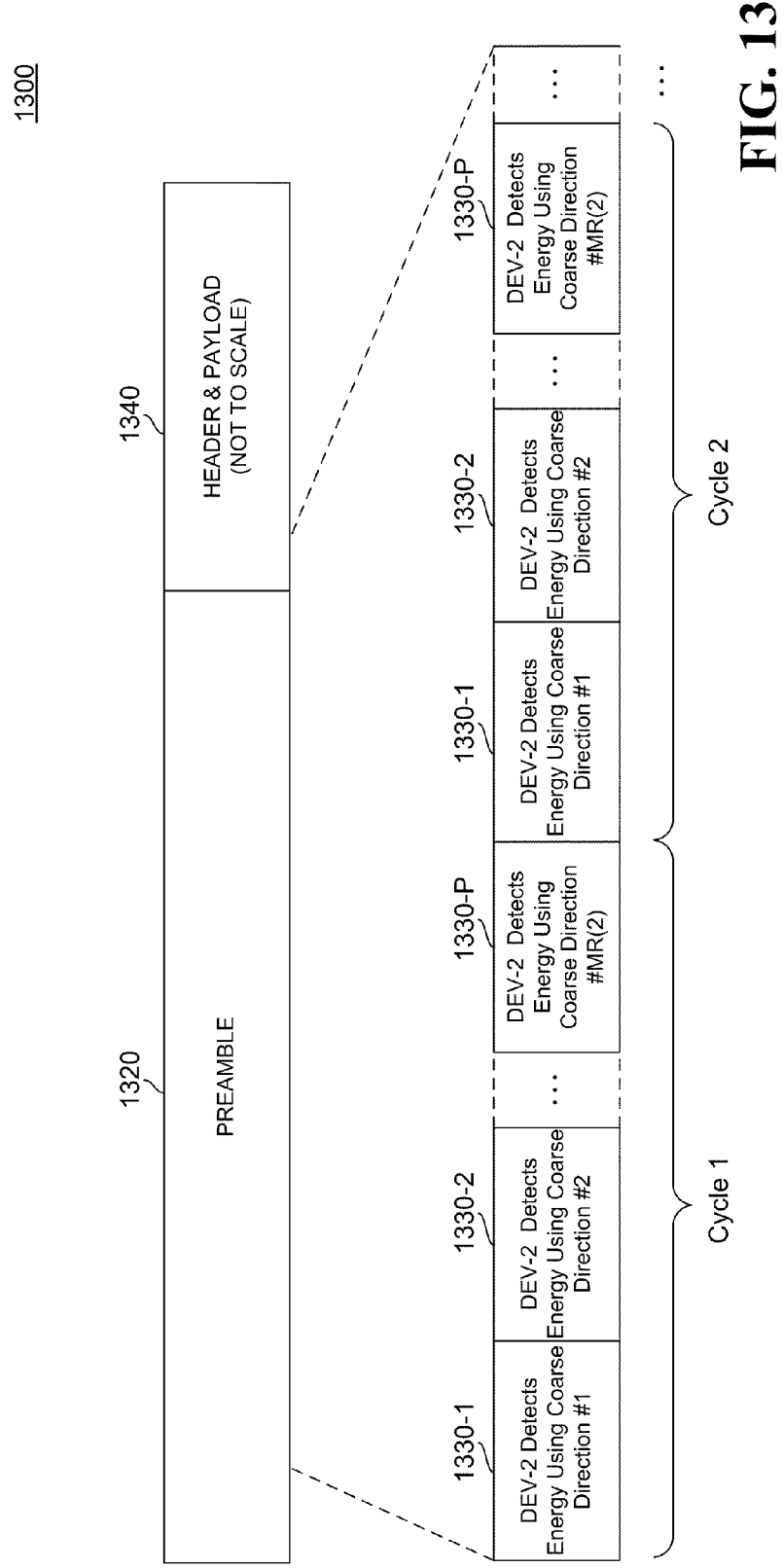
FIG. 13 is a transmitted packet structure and timing description for a device to detect transmission by other devices.

A DEV wanting to transmit a packet in the CAP can use the same multi-cycle sweeping method to sense whether the medium is idle or if another transmission in the medium is possible. In an aspect of the disclosure, if DEV-2 wants to transmit a packet to another DEV, DEV-2 may first sense and measure energy by sweeping over different directions. As illustrated in FIG. 13, during a transmission period 1300 of a packet with a preamble portion 1320 and a header/payload portion 1340, if DEV-2 senses that the medium is idle (i.e., either no preamble is detected or the maximum detected energy is below a given threshold), then it may transmit the packet to the desired DEV. If, on the other hand, DEV-2 determines that the medium is busy it will back off and restart the sensing again at a later time. DEV-2 will continue to switch from one coarse receive direction to another (i.e., sweep through some or all coarse receive directions per cycle) from coarse receive directions in the range #1 to #P, where P=MR(2), the number of possible coarse receive directions of DEV-2, until it times out or detects the presence of energy as illustrated by 1330-1 to 1330-P. In another aspect of the disclosure, DEV-2 may sense the medium in only two directions, i.e., DEV-2's receive direction from the target DEV and a receive direction corresponding to DEV-2's transmit direction. If DEV-2 senses no preamble or energy in these two directions, it might transmit a packet to the target DEV in which case two other devices might be communicating at the same time in another set of almost non-interfering directions therefore achieving spatial reuse.

In one aspect of the disclosure, devices will communicate with other over logical channels. A logical channel is a non-dedicated communication path within a physical frequency channel between two or more devices. Therefore, in a physical frequency channel, multiple logical channels can exist, which means that multiple simultaneous transmissions can occur. A logical channel is considered to be available between a first device and a second device if the transmission direction from the first device to the second device causes no interference or acceptable interference to other active logical channels (i.e. operating at the current transmission time). As an example of logical channels, a device DEV-1 can transmit to another device DEV-2 in the horizontal beam direction and DEV-3 can transmit to DEV-4 in the vertical beam direction at the same time. It should be obvious that the use of multiple logical channels enable spatial reuse.

Figure 14:
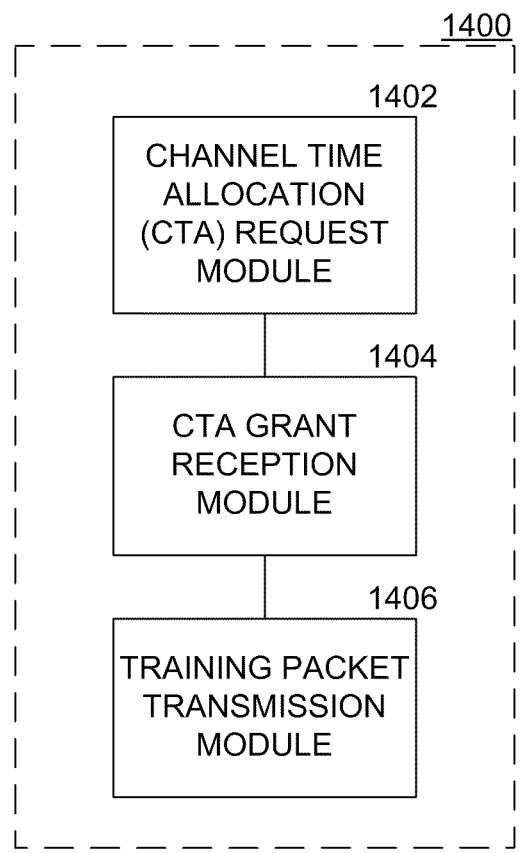
FIG. 14 is a block diagram of a training request apparatus configured in accordance with an aspect of the disclosure.

FIG. 14 illustrates a training apparatus 1400 that may be used with various aspects of the disclosure, the training apparatus 1400 including channel time allocation (CTA) module 1402 for transmitting a channel time allocation request from a first device to a second device, wherein the channel time allocation request comprises a list of devices to be trained by the first device; CTA grant reception module 1404 that receives a channel time allocation granted by the second device; and a training packet transmission module 1406 that transmits, from the first device, at least one training packet to at least one device in the list of devices to be trained during the channel time allocation granted by the second device.

Figure 15:
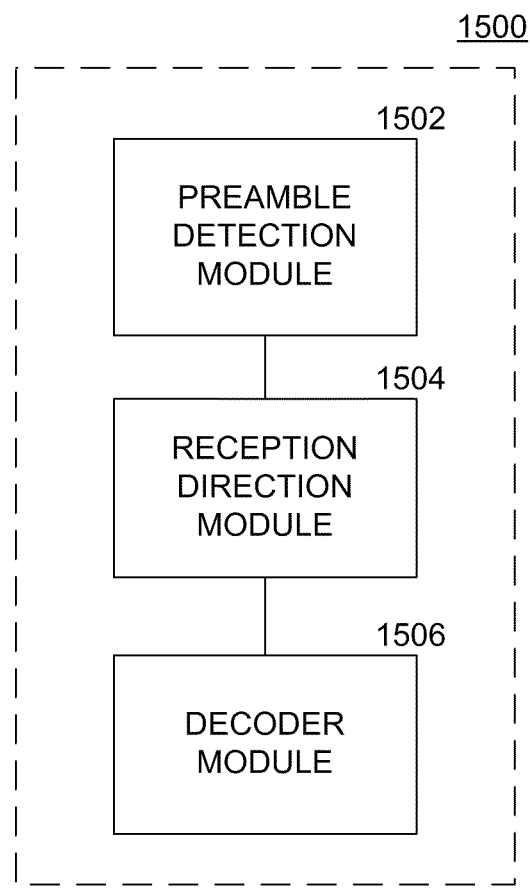
FIG. 15 is a block diagram of a receiver apparatus configured in accordance with an aspect of the disclosure.

FIG. 15 illustrates a receiver apparatus 1500 that may be used with various aspects of the disclosure, the receiver apparatus 1500 including a preamble detection module 1502 that detect at least a portion of a preamble of a packet transmitted by a first device by sweeping over a plurality of receive directions; a preferred reception direction module 1504 that completes the reception of the packet based on a preferred receive direction that was established during a training session with the first device; and a packet decoder module 1506 that receives and decodes a header of the packet based on a first receive direction to identify that the first device had transmitted the packet.

Figure 16:
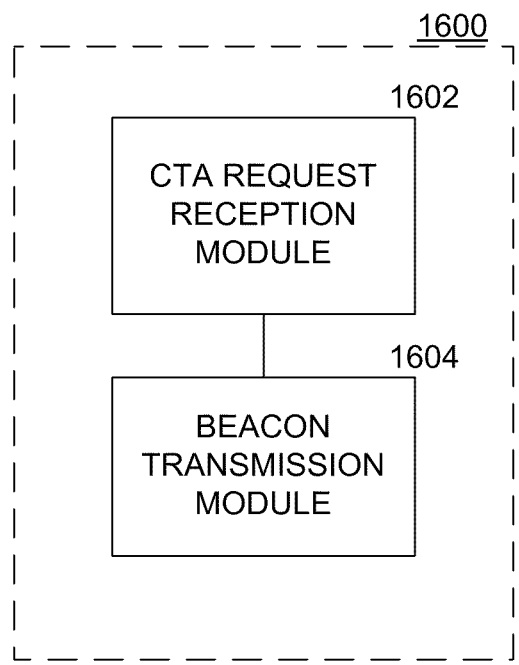
FIG. 16 is a block diagram of a channel time allocation apparatus configured in accordance with an aspect of the disclosure.

FIG. 16 illustrates a channel time allocation apparatus 1600 that may be used with various aspects of the disclosure, the channel time allocation apparatus 1600 including a CTA request reception module 1602 that receives, at a first device, a channel allocation request from a second device, wherein the request comprises a list of devices to be trained by the second device; and a beacon transmission module 1604 that transmits a beacon from the first device, the beacon comprising a channel allocation for the second device based on the channel allocation request.

Figure 17:
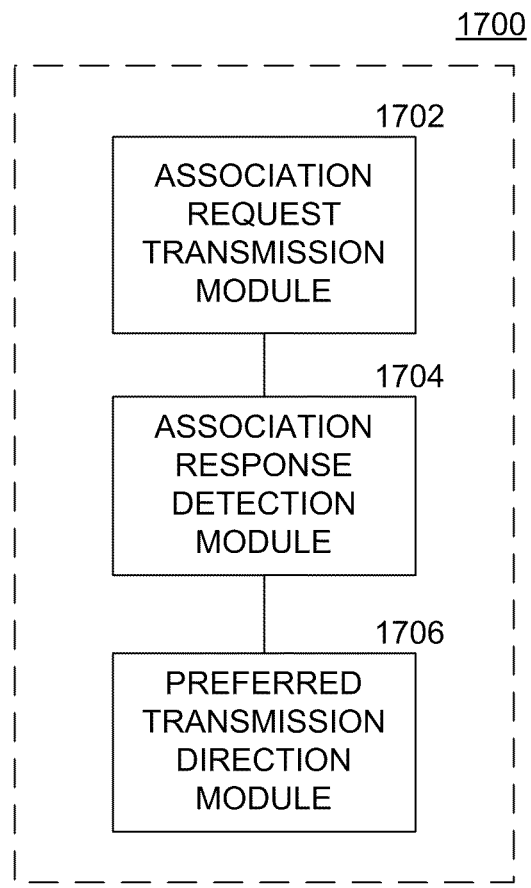
FIG. 17 is a block diagram of an association request apparatus for associating a first device to a second device configured in accordance with an aspect of the disclosure.

FIG. 17 illustrates an association request apparatus 1700 that may be used with various aspects of the disclosure for associating a first device with a second device, the association request transmission apparatus 1700 including an association request transmission module 1702 that transmits, from the first device to the second device, at least one association request including a plurality of packets, each packet being respectively transmitted in a different direction; an association response detection module 1704 that detects an association response from the second device; and a preferred transmission direction module 1706 that determines a preferred first device to second device direction of transmission based on the association response.

Figure 18:
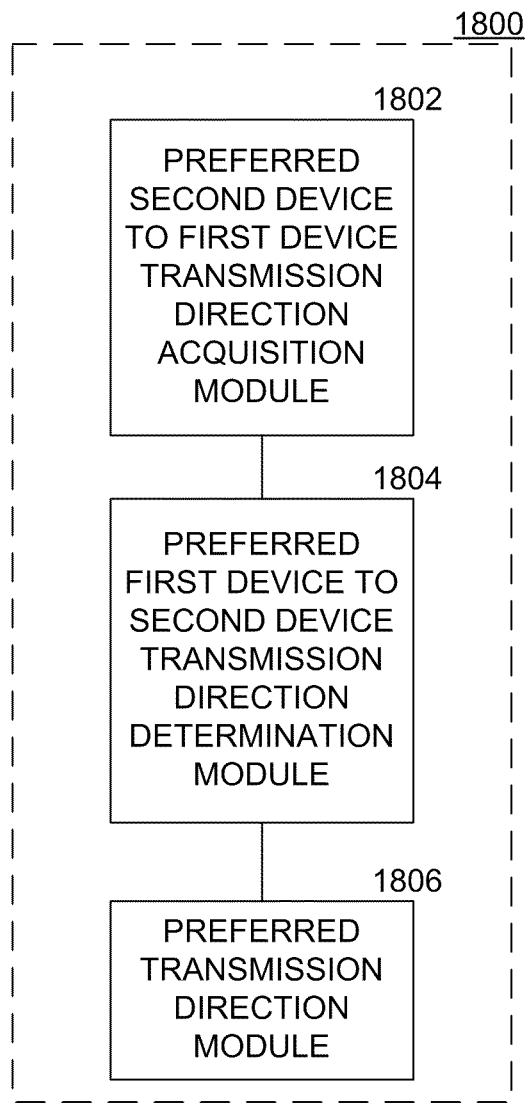
FIG. 18 is a block diagram of a preferred direction acquisition apparatus configured in accordance with an aspect of the disclosure.

FIG. 18 illustrates an association request apparatus 1800 that may be used with various aspects of the disclosure for associating a first device with a second device, the association request apparatus 1800 including a preferred second device to first device transmission direction acquisition module 1802 that acquires a preferred second device to first device transmission direction; a preferred transmission direction determination module 1804 that determines a preferred first device to second device direction of transmission based on the acquisition of the preferred second device to first device transmission direction; and an association request transmission module 1806 that transmits to the second device at least one association request comprising at least one packet from a plurality of packets generated by the first device, each packet being respectively transmittable in a different direction; wherein the at least one packet comprises information related to the determined preferred first device to second device direction of transmission.

Figure 19:
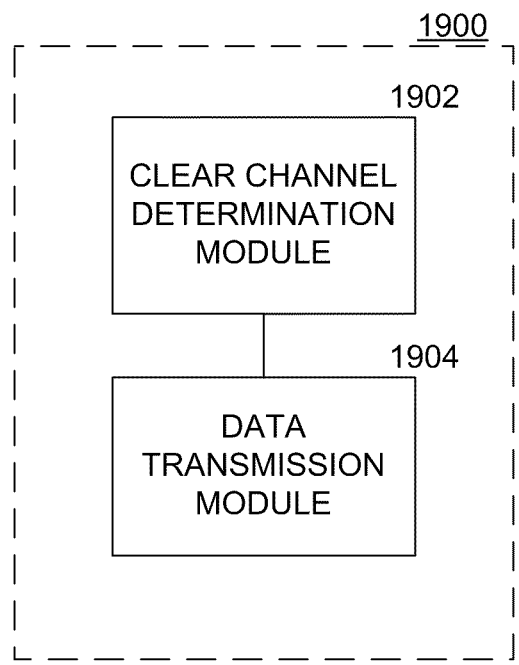
FIG. 19 is a block diagram of a clear channel determination apparatus configured in accordance with an aspect of the disclosure.

FIG. 19 illustrates a channel assessment apparatus 1900 that may be used with various aspects of the disclosure, the channel assessment apparatus 1900 including a clear channel determination module 1902 that determines whether a logical channel is available for transmission by sweeping over a plurality of receive directions; and a data transmission module 1904 that transmits data if the logical channel is available.

Various aspects described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media may include, but are not limited to, magnetic storage devices, optical disks, digital versatile disk, smart cards, and flash memory devices.

The disclosure is not intended to be limited to the preferred aspects. Furthermore, those skilled in the art should recognize that the method and apparatus aspects described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the disclosure may be implemented via any combination of programming languages, including Java, C, C++, Matlab™, Verilog, VHDL, and/or processor specific machine and assembly languages.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method and system aspects described herein merely illustrate particular aspects of the disclosure. It should be appreciated that those skilled in the art will be able to devise various arrangements, which, although not explicitly described or shown herein, embody the principles of the disclosure and are included within its scope. Furthermore, all examples and conditional language recited herein are intended to be only for pedagogical purposes to aid the reader in understanding the principles of the disclosure. This disclosure and its associated references are to be construed as being without limitation to such specifically recited examples and conditions. Moreover, all statements herein reciting principles, aspects, and aspects of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the disclosure. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

The previous description is provided to enable any person skilled in the art to understand fully the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Further, the phrase "at least one of a, b and c" as used in the claims should be interpreted as a claim directed towards a, b or c, or any combination thereof. Unless specifically stated otherwise, the terms "some" or "at least one" refer to one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications comprising:
detecting at least a portion of a preamble of a packet transmitted by a first device by sweeping over a plurality of receive directions;
receiving and decoding a header of the packet based on a first receive direction to identify that the first device transmitted the packet, wherein a second receive direction is incorporated in the header; and
completing reception of the packet based on the second receive direction.

2. The method of claim 1, wherein the first receive direction comprises one of: (1) a working direction determined during the sweep, and (2) a best direction determined during the sweep, the sweep being over all receive directions.

3. The method of claim 2, wherein the best direction is a direction determined based on a link quality indicator.

4. The method of claim 2, wherein the working direction is a direction with sufficient link quality to allow the completion of the reception of the packet.

5. The method of claim 1, wherein the second receive direction further comprises one of (a) a working direction determined during the sweep, and (b) a best direction determined during the sweep, the sweep being over all receive directions.

6. The method of claim 5, wherein the best direction is a direction determined based on a link quality indicator.

7. The method of claim 5, wherein the working direction is a direction with sufficient link quality to allow the completion of the reception of the packet.

8. The method of claim 1, wherein the header comprises a device address.

9. The method of claim 1, wherein the packet was transmitted by the first device in a transmit direction determined during a training process.

10. The method of claim 1, wherein a number of the plurality of sweep directions is associated with devices that were previously trained.

11. The method of claim 1, wherein a number of the plurality of receive directions is less than a number of total receive directions.

12. An apparatus for wireless communications comprising:
- means for detecting at least a portion of a preamble of a packet transmitted by a first device by sweeping over a plurality of receive directions of the apparatus;
- means for receiving and decoding a header of the packet based on a first receive direction to identify that the first device transmitted the packet, wherein a second receive direction is incorporated in the header; and
- means for completing reception of the packet based on the second receive direction.

13. The apparatus of claim 12, wherein the first receive direction comprises one of: (1) a working direction determined during the sweep, and (2) a best direction determined during the sweep, the sweep being over all receive directions.

14. The apparatus of claim 13, wherein the best direction is a direction determined based on a link quality indicator.

15. The apparatus of claim 13, wherein the working direction is a direction with sufficient link quality to allow the completion of the reception of the packet.

16. The apparatus of claim 12, wherein the second receive direction further comprises one of (a) a working direction determined during the sweep, and (b) a best direction determined during the sweep, the sweep being over all receive directions.

17. The apparatus of claim 16, wherein the best direction is a direction determined based on a link quality indicator.

18. The apparatus of claim 16, wherein the working direction is a direction with sufficient link quality to allow the completion of the reception of the packet.

19. The apparatus of claim 12, wherein the header comprises a device address.

20. The apparatus of claim 12, wherein the packet was transmitted by the first device in a transmit direction determined during a training process.

21. The apparatus of claim 12, wherein a number of the plurality of sweep directions is associated with devices that were previously trained by the apparatus.

22. The apparatus of claim 12, wherein a number of the plurality of receive directions is less than a number of total receive directions of the apparatus.

23. A computer readable storage device for wireless communications encoded with a computer program executed by an apparatus,
the computer readable storage device comprising instructions executable to:
- detect at least a portion of a preamble of a packet transmitted by a first device by sweeping over a plurality of receive directions;
- receive and decode a header of the packet based on a first receive direction to identify that the first device transmitted the packet, wherein a second receive direction is incorporated in the header; and
- complete reception of the packet based on the second receive direction.

24. An apparatus for wireless communications comprising:
a processing system configured to:
- detect at least a portion of a preamble of a packet transmitted by a first device by sweeping over a plurality of receive directions of the apparatus;
- receive and decode a header of the packet based on a first receive direction to identify that the first device transmitted the packet, wherein a second receive direction is incorporated in the header; and
- complete reception of the packet based on the second receive direction.

25. The apparatus of claim 24, wherein the first receive direction comprises one of: (1) a working direction determined during the sweep, and (2) a best direction determined during the sweep, the sweep being over all receive directions.

26. The apparatus of claim 25, wherein the best direction is a direction determined based on a link quality indicator.

27. The apparatus of claim 25, wherein the working direction is a direction with sufficient link quality to allow the completion of the reception of the packet.

28. The apparatus of claim 24, wherein the second receive direction further comprises one of (a) a working direction determined during the sweep, and (b) a best direction determined during the sweep, the sweep being over all receive directions.

29. The apparatus of claim 28, wherein the best direction is a direction determined based on a link quality indicator.

30. The apparatus of claim 28, wherein the working direction is a direction with sufficient link quality to allow the completion of the reception of the packet.

31. The apparatus of claim 28, wherein the header comprises a device address.

32. The apparatus of claim 28, wherein the packet was transmitted by the first device in a transmit direction determined during a training process.

33. The apparatus of claim 28, wherein the plurality of sweep directions are associated with devices that were previously trained by the apparatus.

34. The apparatus of claim 28, wherein a number of the plurality of receive directions is less than a number of total receive directions of the apparatus.

35. A wireless node comprising:
an antenna; and
a processing system configured to:
- detect at least a portion of a preamble of a packet transmitted by a first device by sweeping over a plurality of receive directions;
- receive via the antenna and decode a header of the packet based on a first receive direction to identify that the first device transmitted the packet, wherein a second receive direction is incorporated in the header; and
- complete reception of the packet via the antenna based on the second receive direction.

* * * * *